US012704119B2

(12) United States Patent
Avey et al.

(10) Patent No.: US 12,704,119 B2
(45) **Date of Patent: *Aug. 11, 2026**

(54) SEALING ASSEMBLY WITH REPOSITIONABLE SEAL

(71) Applicant: GD Energy Products, LLC, Tulsa, OK (US)

(72) Inventors: Adam Bradley Avey, Tulsa, OK (US); Konner Casey Kay, Broken Arrow, OK (US); Christopher Douglas Degginger, Broken Arrow, OK (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/049,557

(22) Filed: Feb. 10, 2025

(65) Prior Publication Data

US 2025/0180000 A1 Jun. 5, 2025

Related U.S. Application Data

(63) Continuation of application No. 17/573,241, filed on Jan. 11, 2022, now Pat. No. 12,247,557.

(51) Int. Cl.

| | |
|---|---|
| ***F04B 39/00*** | (2006.01) |
| ***F04B 37/12*** | (2006.01) |
| ***F16J 15/00*** | (2006.01) |

(52) U.S. Cl.
CPC .............. *F04B 39/00* (2013.01); *F04B 37/12* (2013.01); *F16J 15/002* (2013.01)

(58) Field of Classification Search
CPC .......... F04B 39/00; F04B 37/12; F16J 15/002
See application file for complete search history.

(56) References Cited

U.S. PATENT DOCUMENTS 2,756,960 A * 7/1956 Church ................. F16K 5/0264 251/165
2,856,857 A * 10/1958 Saalfrank .............. F04B 43/067 417/385
3,700,003 A * 10/1972 Smith .................. F16K 5/0264 251/207
3,792,939 A * 2/1974 Zalis ....................... F04B 9/042 417/454

(Continued)

FOREIGN PATENT DOCUMENTS

JP 2011256828 A * 12/2011

OTHER PUBLICATIONS

Gardner Denver, Inc., "Single Action Triplex Pump," Design Version: 6, Nov. 2020, 54 pages.

*Primary Examiner* — Eugene G Byrd
(74) *Attorney, Agent, or Firm* — Edell, Shapiro & Finnan, LLC

(57) ABSTRACT

A sealing assembly for a fluid end of a reciprocating pump is installable within a segment of a casing of the fluid end and is arranged to form a seal with the segment. The sealing assembly includes a closure element and a seal element. The closure element has a sealing portion with a lateral surface that faces an interior wall of the segment of the fluid end. The seal element is sized to be installed around the closure element and includes a repositionable seal. The repositionable seal is movable axially with respect to the closure element so that the repositionable seal can be positioned in multiple sealing positions.

20 Claims, 11 Drawing Sheets

P1
309
C1
328(1),
328(2)
326
322
330
300
310
302
307
500
304
2224
206
308
320

(56) References Cited

U.S. PATENT DOCUMENTS 3,866,813 A 2/1975 Arnold
5,208,043 A 5/1993 Gatarz
5,209,495 A * 5/1993 Palmour ............... F04B 53/164 277/926
5,234,194 A * 8/1993 Smith .................. F16K 5/0285 277/540
5,362,215 A * 11/1994 King ...................... F04B 49/10 137/542
5,540,570 A * 7/1996 Schuller ................ F04B 1/0421 417/552
6,623,259 B1 * 9/2003 Blume .................. F04B 53/164 417/454
6,910,871 B1 * 6/2005 Blume .................. F04B 53/007 417/454
7,074,020 B2 * 7/2006 Navarro .................. F04B 9/113 137/542
7,168,440 B1 * 1/2007 Blume .................. F04B 53/102 137/902
7,186,097 B1 3/2007 Blume
7,506,574 B2 3/2009 Jensen
7,717,433 B2 * 5/2010 Taylor ...................... F16J 15/26 277/416
9,010,761 B2 4/2015 Deutsch
9,494,197 B2 11/2016 Capoldi
9,739,130 B2 * 8/2017 Young ..................... F04B 53/14
10,240,678 B2 3/2019 Toth
10,288,178 B2 5/2019 Nowell et al.
10,519,950 B2 12/2019 Foster
10,591,070 B2 * 3/2020 Nowell .................. F16J 15/062
10,907,738 B2 2/2021 Nowell et al.
10,962,001 B2 * 3/2021 Nowell ................... F04B 53/16
11,225,861 B1 * 1/2022 Dille ....................... F04B 19/22
11,408,419 B2 * 8/2022 Foster ..................... F16B 39/24
11,421,679 B1 8/2022 Mullins
11,421,680 B1 * 8/2022 Smith ................... F04B 53/166
11,441,424 B2 9/2022 Foster
11,454,321 B2 * 9/2022 Mullins ................. F04B 53/164
11,692,543 B2 * 7/2023 Chase ........................ F16J 9/20 92/87
11,698,063 B2 7/2023 Jian
12,247,557 B2 * 3/2025 Avey ...................... F16J 15/002
2003/0184018 A1 * 10/2003 Upton .................... F16J 15/004 277/318
2004/0234404 A1 * 11/2004 Vicars ..................... F04B 53/16 417/571
2006/0045782 A1 * 3/2006 Kretzinger ............. F04B 53/16 417/559
2009/0097992 A1 * 4/2009 Fischer ............... F04C 15/0042 181/252
2011/0189040 A1 * 8/2011 Vicars ..................... F04B 53/00 417/559
2012/0141308 A1 * 6/2012 Saini ................... F04B 53/1025 977/773
2018/0275012 A1 * 9/2018 Hunt .................... B01D 65/104
2019/0010941 A1 * 1/2019 Li ......................... F04B 53/164
2019/0032781 A1 * 1/2019 Christopher ......... F16J 15/3224
2020/0355270 A1 * 11/2020 Li .......................... F16J 15/002
2020/0386218 A1 * 12/2020 Feistel ..................... F16J 15/26
2020/0400130 A1 * 12/2020 Poehls ................ E21B 43/2607
2021/0190067 A1 * 6/2021 Nowell ................. F04B 1/0538
2023/0184241 A1 * 6/2023 Avey .................... F16J 15/3268 277/314

* cited by examiner

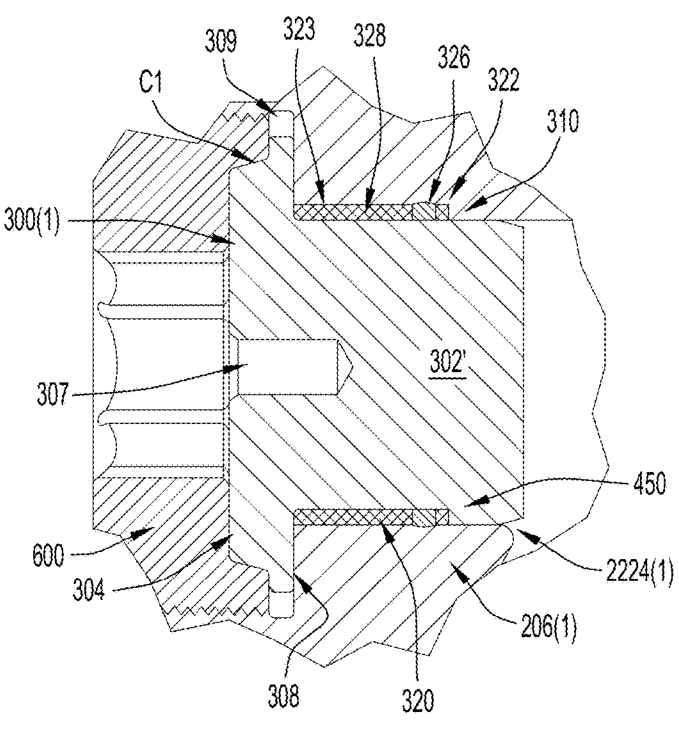
FIG.9
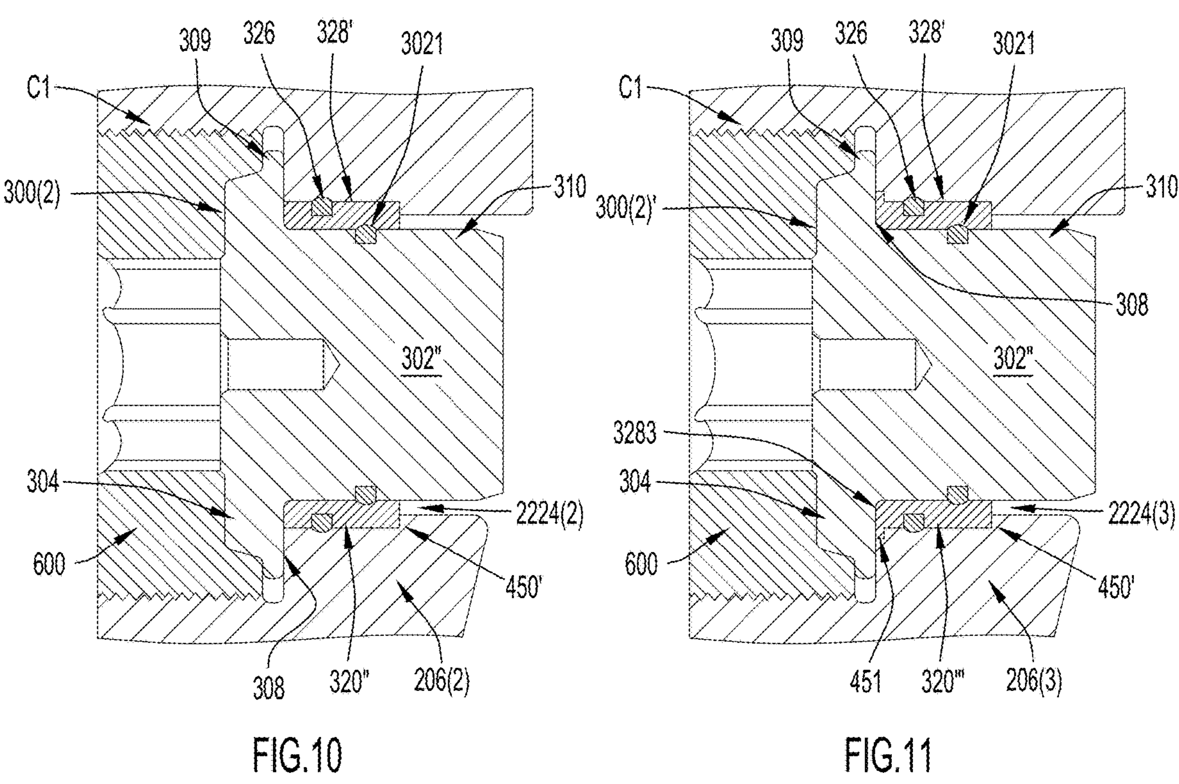
FIG.10
FIG.11

A
300(4)
800
2229
206
600
104
2128
2124
212
214
210
208
2226
216
2126
2224
2228
222

800
600
650
602
640
300(4)
C6
2229
2227
2226

800
600
652
602
641
300(4)
C7
2229
2227
2226

SEALING ASSEMBLY WITH REPOSITIONABLE SEAL

CROSS REFERENCE TO RELATED APPLICATIONS

This application is a continuation of U.S. patent application Ser. No. 17/573,241, filed on Jan. 11, 2022, and entitled "Sealing Assembly with Repositionable Seal," the disclosure of which is incorporated by reference in entirety.

FIELD OF INVENTION

The present invention relates to the field of high pressure reciprocating pumps and, in particular, to a sealing arrangement for fluid ends of high pressure reciprocating pumps.

BACKGROUND

High pressure reciprocating pumps are often used to deliver high pressure fluids during earth drilling operations. One or more sealing arrangements are typically provided in the fluid end to seal conduits formed in the fluid end and prevent, or at least discourage, leakage. More specifically, the fluid end may define an internal chamber and one or more conduits may define pathways between the internal chamber and one or more external surfaces of the fluid end. At least some segments of these conduits may be sealed with a sealing assembly (e.g., a cover, plug, and/or sleeve) that includes or defines one or more seals. These seals may prevent, or at least discourage, leakage through the conduits.

SUMMARY

The present application relates to techniques for sealing a segment of a fluid end of a high pressure reciprocating pump. The techniques may be embodied as a sealing assembly that is provided independent of any other elements or that is incorporated in a fluid end as part of a kit, as part of a fluid end, and/or as part of a reciprocating pump. Additionally, the techniques may be embodied as a method for sealing a segment of a fluid end of a high pressure reciprocating pump.

More specifically, in accordance with at least one embodiment, the present application is directed to a sealing assembly for a fluid end of a reciprocating pump. The sealing assembly is installable within a segment of a casing of the fluid end and is arranged to seal the segment. The sealing assembly includes a closure element and a seal element. The closure element has a sealing portion with a lateral surface that faces an interior wall of the segment of the fluid end. The seal element is sized to be installed around the lateral surface of the closure element. Thus, when the sealing assembly is installed in the segment of the casing of the fluid end, the seal element will be positioned between the closure element and the interior wall of the segment. The seal element also includes a repositionable seal that is movable axially with respect to the closure element so that the repositionable seal can be positioned in multiple sealing positions.

Among other advantages, a sealing assembly that includes a repositionable seal as part of a seal element positioned around a closure element allows for more seal placements over a fixed axial length, at least as compared to closure elements with multiple grooves that define predetermined locations for seals. For example, instead of being constrained by fixed groove locations, the seal element of the sealing assembly presented herein can be reconfigured to move a seal position to any desired location along the length of the seal element and/or closure element. The sealing assembly presented herein may also be less expensive to manufacture than multiple groove arrangements. Still further, since the sealing assembly presented herein allows multiple seal placements, the sealing assembly may reduce costs and alleviate inventory tracking/maintenance issues for end users that typically use multiple plugs/covers/sleeves to achieve multiple seal positions.

In at least some embodiments, the seal element includes one or more seal carriers configured to position the repositionable seal with respect to the closure element. For example, the one or more seal carriers may form a pocket for the repositionable seal and the pocket may be axially repositionable, e.g., to progressively reposition the repositionable seal along the downstream direction. In some of these instances, an internal surface of the repositionable seal abuts the pocket and any internal surfaces of any seal carriers defining the pocket abut the lateral surface of the closure element. Additionally or alternatively, the pocket may be repositionable by replacing the one or more seal carriers with one or more new seal carriers that form a new pocket in a new axial position (e.g., a downstream axial position). Among other advantages, the pocketed seal carriers may protect an internal surface of the repositionable seal from wear on its internal surface and may prevent displacement of the repositionable seal.

As an alternative to pocketed seal carriers, and as another example, the one or more seal carriers and the repositionable seal can collectively define both an external surface and an internal surface of the seal element. In these instances, the one or more seal carriers may be rearranged on the closure element to axially reposition the repositionable seal (e.g., along the downstream direction). Among other advantages, these seal carriers may be easy to replace since the seal carriers essentially operate independently of the repositionable seal and can be provided as modular components.

In any of the aforementioned embodiments, the repositionable seal may wear prior to the one or more seal carriers and, thus, the seal carriers may be reusable across configurations, or at least across some configurations. However, if the repositionable seal wears, repositioning the repositionable seal may include replacing the repositionable seal with a new repositionable seal of like dimensions during a repositioning/reconfiguring.

Still further, in some embodiments of the foregoing sealing assembly, the seal element is a monolithic component with the repositionable seal integrally formed therein. In such embodiments, the repositionable seal is axially repositionable (e.g., along the downstream direction) by replacing the seal element with a new seal element that includes a new seal in a new axial position. Among other advantages, the monolithic component may remove variability associated with multiple moving components and may be simple to install.

Still further, in some embodiments, the seal element is a first seal element and the sealing assembly also includes a second seal element sized to be installed around the lateral surface of the closure element. The second seal element is configured to replace the first seal element when fluid starts to leak through the repositionable seal and a first portion of the casing engaged with the repositionable seal. The second seal element includes a second seal that is axially offset from the repositionable seal so that the second seal engages a second portion of the casing that is axially offset from (e.g., disposed downstream of) the first portion of the casing. In some of these embodiments, the sealing assembly also includes a third seal element sized to be installed around the lateral surface of the closure element and configured to replace the second seal element when fluid starts to leak through the second seal and the second portion of the casing. The third seal element includes a third seal that is axially offset from the second seal so that the third seal engages a third portion of the casing that is axially offset from (e.g., disposed downstream of) the second portion of the casing.

In accordance with additional embodiments, the present application is directed to a seal kit for a sealing assembly that is configured to seal a segment of a casing of a fluid end of a reciprocating pump. The sealing assembly includes a closure element with a lateral surface that faces an interior wall of the segment. Meanwhile, the seal kit includes a first seal element and a second seal element that are each configured to be installed around the lateral surface of the closure element. The first seal element includes a first seal positioned to seal against a first portion of the casing forming the segment. The second seal element includes a second seal positioned to seal against a second portion of the casing forming the segment, the second portion being axially offset from (e.g., downstream of) the first portion.

In some of these embodiments, the seal kit also includes a third seal element configured to be installed around the lateral surface of the closure element. The third seal element includes a third seal positioned to seal against a third portion of the casing forming the segment, the third portion being axially offset from (e.g., downstream of) the second portion. The kit could also include more than three seal elements. Regardless of the number of seal elements included in a kit, any of the seal elements and/or the sealing assembly included in a kit may include any combination of the features and realize any advantages described above.

In accordance with yet additional embodiments, the present application is directed to a method of sealing an externally open segment of a fluid end of a reciprocating pump with a sealing assembly, the fluid end being driven by a power end. The method includes positioning a first seal element around a lateral surface of a closure element to form a first sealing assembly. Then, the first sealing assembly is installed in the externally open segment so that the lateral surface of the closure element faces an interior wall of the externally open segment. The first seal element includes a first seal positioned to seal against a first portion of the interior wall of the externally open segment when the sealing assembly is installed in the segment.

After installation, the power end is activated to cause fluid to flow through the fluid end. Eventually, the power end is deactivated and the first seal element is removed from the closure element. A second seal element is then positioned around the lateral surface of the closure element to form a second sealing assembly. The second sealing assembly is then installed in the externally open segment (i.e., the sealing assembly is re-installed with the seal in a second position). The second sealing assembly is installed so that the lateral surface of the closure element faces the interior wall of the externally open segment and the second seal element includes a second seal positioned to seal against a second portion of the interior wall of the externally open segment that is axially offset from (e.g., downstream of) the first portion of the interior wall. After this installation, the power end is reactivated to cause the fluid to flow through the fluid end. In different embodiments, any of the seal elements and/or the sealing assembly used in this method may include any combination of the features and realize any advantages described above. Additionally or alternatively, the method may utilize any kits described above.

In some embodiments, the method further includes deactivating the power end subsequent to reactivating the power end. Then, the second seal element can be removed from the closure element and a third seal element can be positioned around the lateral surface of the closure element to form a third sealing assembly. The third sealing assembly can then be installed in the externally open segment so that the lateral surface of the closure element faces the interior wall of the externally open segment. The third seal element includes a third seal positioned to seal against a third portion of the interior wall of the externally open segment that is axially offset from (e.g., downstream of) the second portion of the interior wall.

BRIEF DESCRIPTION OF THE DRAWINGS

To complete the description and in order to provide for a better understanding of the present invention, a set of drawings is provided. The drawings form an integral part of the description and illustrate embodiments of the present invention, which should not be interpreted as restricting the scope of the invention, but just as examples of how the invention can be carried out. The drawings comprise the following figures:

FIG. 9 is a cross sectional view of another example embodiment of a fluid end with the closure element of FIG. 4B and the seal element of FIG. 5 forming a sealing assembly installed therein.

FIGS. 10 and 11 are cross sectional views of additional example embodiments of fluid ends with a sealing assembly formed in accordance with embodiments of the present application installed therein.

Like reference numerals have been used to identify like elements throughout this disclosure.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the sealing assembly presented herein provides a bore seal with an extended lifespan, at least as compared to conventional (e.g., stationary) bore seals. The sealing assembly provides an extended lifespan because a seal element included in the sealing assembly can be selectively/progressively axially repositioned to seal against unworn surfaces. For example, over time, the seal element/seal ring can move/migrate axially upstream with respect to the remainder of the sealing assembly, sealing against surfaces that were previously unexposed to fluid for which the seal ring is providing a seal and/or previously unexposed to wear associated with providing such a seal. As is detailed below, the seal ring is included in or coupled to a seal element that is installable between a fluid end casing and a closure element. Then, the seal element may be moved axially by reconfiguring the seal element and/or by selectively replacing the seal element.

Notably, since the sealing is achieved between a closure element and the fluid end casing (either directly or indirectly, e.g., via a sleeve disposed between the seal element and the casing), a closure element that supports the sealing assembly (e.g., a plug, cover, and/or sleeve) need not be extensively machined to form multiple grooves. This may save cost and/or time during manufacturing. Moreover, when a closure element includes multiple grooves, the grooves have to be adequately spaced to ensure that each groove is supported by enough material to avoid failure. That is, if a closure element includes multiple grooves, the grooves must be axially spaced along the closure element so that fin-like structures extending between the grooves are strong enough to support a seal against forces generated by high pressures acting on the seal.

Still further, with the techniques presented, the same closure element (e.g., plug, cover, sleeve, or even plunger) can be re-used while one or more sealing positions defined on the closure element and/or the fluid end are moved. By comparison, some solutions achieve different sealing positions with different closure elements, which wastes material and creates cost and inventory disadvantages for the end user, who must buy, track and maintain multiple closure elements. In fact, in at least some embodiments presented herein, the sealing assembly can provide multiple sealing assemblies for preexisting closure elements and/or fluid ends (e.g., preexisting casings and preexisting suction and/or discharge plugs). That is, at least some embodiments presented herein provide a solution that can be retrofit onto existing pumping/drilling components.

Figure 1:
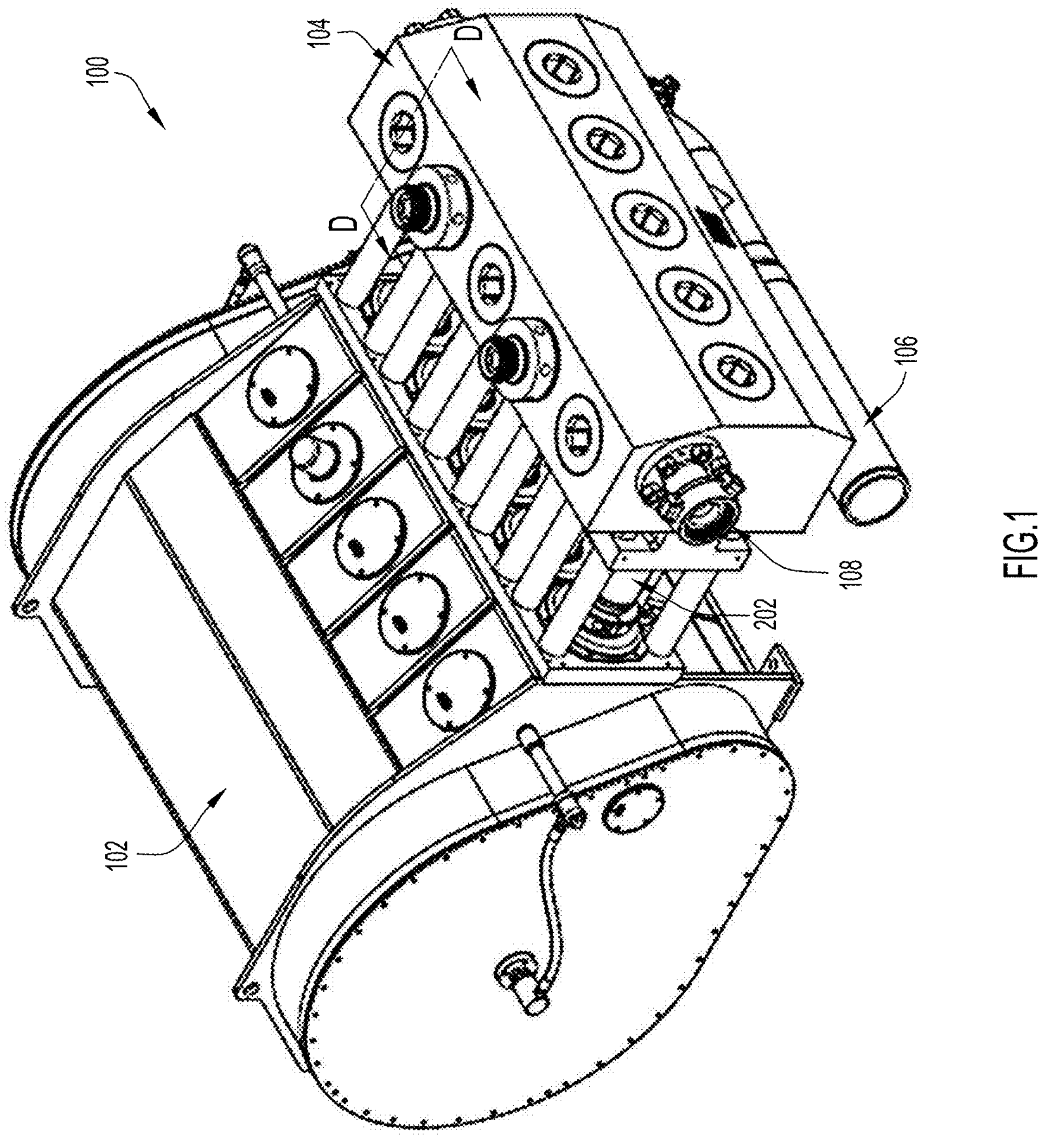
FIG. 1 is a perspective view of a reciprocating pump including a fluid end, according to an example embodiment.

Now referring to FIG. 1 for a description of an exemplary embodiment of a reciprocating pump 100 in which the sealing assembly presented herein may be included. The reciprocating pump 100 includes a power end 102 and a fluid end 104. The power end 102 includes a crankshaft that drives a plurality of reciprocating plungers within the fluid end 104 to pump fluid at high pressure. Generally, the power end 102 is capable of generating forces sufficient to cause the fluid end 104 to deliver high pressure fluids to earth drilling operations. For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations. However, to be clear, this example is not intended to be limiting and the present application may be applicable to both fracking and drilling operations.

Often, the reciprocating pump 100 may be quite large and may, for example, be supported by a semi-tractor truck ("semi") that can move the reciprocating pump 100 to and from a well. Specifically, in some instances, a semi may move the reciprocating pump 100 off a well when the reciprocating pump 100 requires maintenance. However, a reciprocating pump 100 is typically moved off a well only when a replacement pump (and an associated semi) is available to move into place at the well, which may be rare. Thus, often, the reciprocating pump is taken offline at a well and maintenance is performed while the reciprocating pump 100 remains on the well. If not for this maintenance, the reciprocating pump 100 could operate continuously to extract natural oil and gas (or conduct any other operation). Consequently, any improvements that extend the lifespan of components of the reciprocating pump 100, especially typical "wear" components, and extend the time between maintenance operations (i.e., between downtime) are highly desirable.

Figure 2:
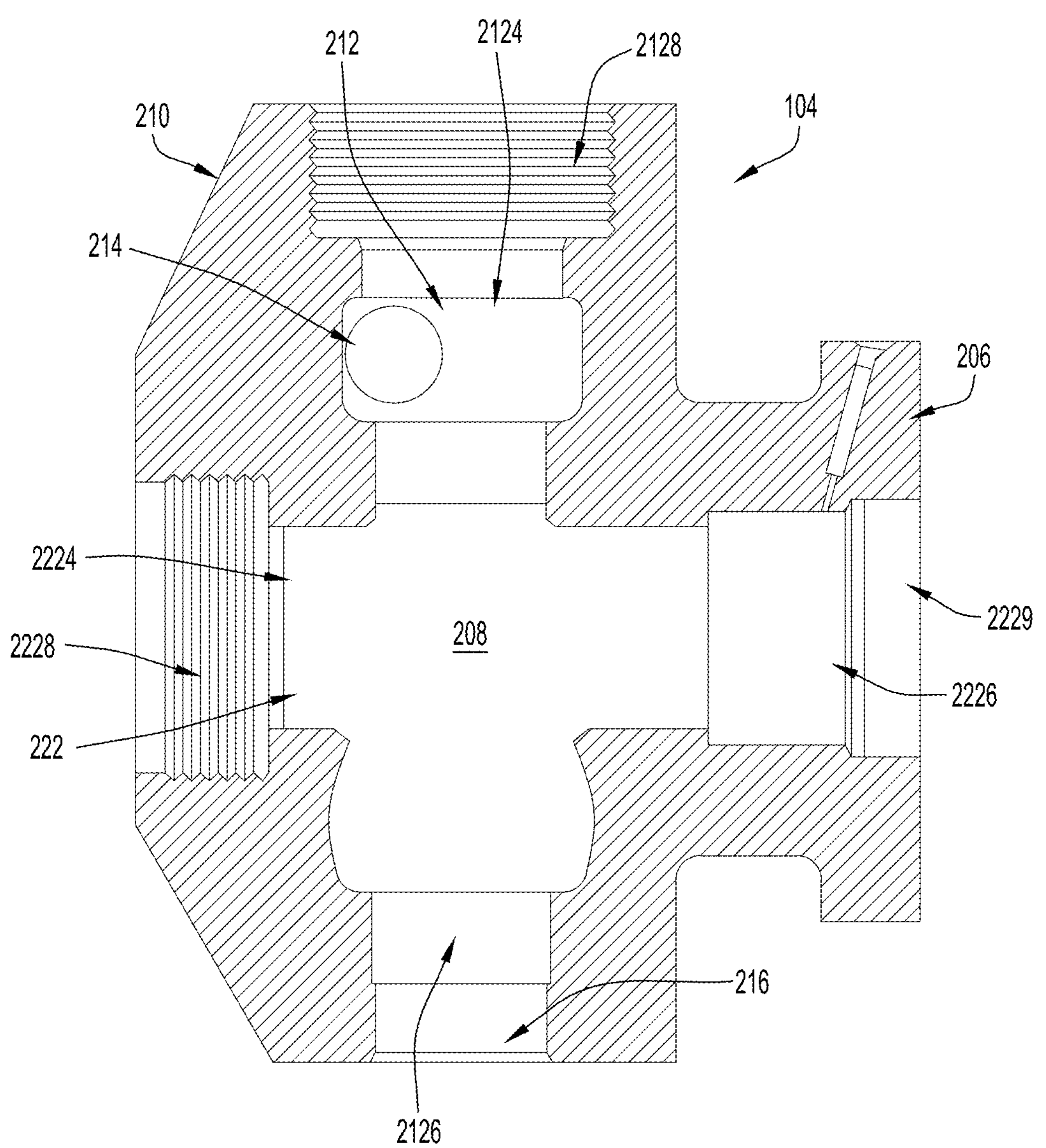
FIG. 2 is a cross sectional view taken along line D-D of FIG. 1.

FIG. 2 is a sectional view taken along line D-D of FIG. 1, which is representative of a central or plunger axis of one of the plungers 202 (see FIG. 1) included in reciprocating pump 100. In FIG. 2, the plunger 202 is omitted; however, generally, the fluid end 104 forms a plurality of pumping chambers 208 and each chamber 208 includes a plunger that reciprocates within a casing 206 of the fluid end 104. With each stroke of the plunger 202, low pressure fluid is drawn into the pumping chamber 208 and high pressure fluid is discharged. Often, the fluid within the pumping chamber 208 contains abrasive material (i.e., "debris") that can damage seals formed in the reciprocating pump 100.

The pumping paths and pumping chamber 208 of the fluid end 104 are formed by conduits that extend through the casing 206 to define openings at an external surface 210 of the casing 206. More specifically, a first conduit 212 extends longitudinally (e.g., vertically) through the casing 206 while a second conduit 222 extends laterally (e.g., horizontally) through the casing 206. Thus, conduit 212 intersects conduit 222 to at least partially define the pumping chamber 208. As is illustrated, the diameters of conduit 212 and conduit 222 may vary throughout the casing 206 so that the conduits can receive various structures, such as sealing assemblies or components thereof.

Regardless of the diameters of conduit 212 and conduit 222, each conduit may include two segments, each of which extend from the pumping chamber 208 to the external surface 210. Specifically, conduit 212 includes a first segment 2124 and a second segment 2126 that opposes the first segment 2124. Likewise, conduit 222 includes a third segment 2224 and a fourth segment 2226 that opposes the third segment 2224. In the depicted embodiment, the segments of a conduit (e.g., segments 2124 and 2126 or segments 2224 and 2226) are substantially coaxial while the segments of different conduits are substantially orthogonal. However, in other embodiments, segments 2124, 2126, 2224, and 2226 may be arranged along any desired angle or angles, for example, to intersect pumping chamber 208 at one or more non-straight angles.

Still referring to FIG. 2, in the depicted embodiment, conduit 212 defines a fluid path through the fluid end 104. Segment 2126 is an intake segment that connects the pumping chamber to piping delivering fluid to the fluid end 104. Meanwhile, segment 2124 is an outlet segment that allows compressed fluid to exit the fluid end 104. Thus, in operation, segments 2126 and 2124 may include valve components (e.g., one-way valves) that allow segments 2126 and 2124 to selectively open. However, typically, valve components in the inlet segment 2126 may be secured therein by piping while valve components in outlet segment 2124 may be secured therein by a sealing assembly that, for example, is secured to and seals against an interior wall of casing 206 defining segment 2124.

On the other hand, conduit 222 defines, at least in part, a cylinder for plunger 202, and/or connects the casing 206 to a cylinder for plunger 202. Thus, reciprocation of a plunger in or adjacent to segment 2226 draws fluid into the fluid chamber 208 via inlet segment 2126 and pumps the fluid out of the fluid chamber 208 via outlet segment 2124. Segment 2224 is an access segment that provides access to parts and surfaces disposed or defined within casing 206. However, in some embodiments, conduit 222 need not include segment 2224 and conduit 222 may be formed from a single segment (segment 2226) that extends from the pumping chamber 208 to the external surface 210.

Still referring to FIG. 2, but now in combination with FIG. 1, although FIG. 2 depicts a single pumping chamber 208, it should be understood that a fluid end 104 can include multiple pumping chambers 208 arranged side-by-side. In some embodiments, the fluid end 104 may be modular and different casing segments may house one or more pumping chambers 208. Additionally or alternatively, multiple pumping chambers 208 may be formed in a single casing segment or casing. Regardless of how the casing 206 is formed, the one or more pumping chambers 208 included therein are arranged side-by-side so that corresponding conduits are positioned adjacent each other and generate substantially parallel pumping action.

In operation, fluid may enter fluid end 104 via multiple openings, as represented by opening 216 in FIG. 2, and exit fluid end 104 via multiple openings, as represented by opening 214 in FIG. 2. In at least some embodiments, fluid enters openings 216 via pipes of a piping system 106 (see FIG. 1), flows through pumping chamber 208 (due to reciprocation of a plunger 202), and then flows through openings 214 into a channel 108 (see FIG. 1). However, piping system 106 and channel 108 are merely example conduits and, in various embodiments, fluid end 104 may receive and discharge fluid via any number of pipes and/or conduits, along pathways of any desirable size or shape.

During operations of pump 100, the first segment 2124 (of conduit 212), the third segment 2224 (of conduit 222), and the fourth segment 2226 (of conduit 222) may each be "closed" segments. By comparison, the second segment 2126 (of conduit 212) may be an "open" segment that allows fluid to flow from the external surface 210 to the pumping chamber 208. That is, for the purposes of this application, a "closed" segment may prevent, or at least substantially prevent, direct fluid flow between the pumping chamber 208 and the external surface 210 of the casing 206 while an "open" segment may allow fluid flow between the pumping chamber 208 and the external surface 210. To be clear, "direct fluid flow" requires flow along only the segment so that, for example, fluid flowing from pumping chamber 208 to the external surface 210 along segment 2124 and channel 108 does not flow directly to the external surface 210 via segment 2124.

In operation, segment 2124, segment 2224, and segment 2226 may be each be completely capped, sealed, plugged, or otherwise closed to prevent fluid from passing through one of these segments to the external surface 210 of casing 206. In segment 2124 or segment 2224, this seal may be achieved with a plug-style or plug-type version of sealing assembly 300. For simplicity, the Figures (e.g., FIGS. 8A-8C and 9-13) only show a plug-style sealing assembly positioned in segment 2224, but segment 2124 may also receive any plug-style embodiment of sealing assembly 300. In fact, in some instances, a sealing assembly 300 disposed in segment 2124 may be referred to as a discharge plug and a sealing assembly 300 disposed in segment 2224 may be referred to as a suction plug.

On the other hand, a sleeve-style/type version of sealing assembly 300 (i.e., a modified version of sealing assembly 300) may be used to seal segment 2226. A sleeve-style sealing assembly 300 may be an annular version of sealing assembly 300. For example, although not shown herein, a sleeve-style sealing assembly 300 may extend between casing 206 and a packing arrangement. Thus, in some instances, a sealing assembly 300 disposed in segment 2226 may be referred to as a packing sleeve. For the purposes of this application, a sleeve- or plug-style closer element may be referred to as a stationary closure element. However, the techniques presented herein need not be limited to stationary closure elements and may also be used in combination with plungers or other movable closure elements, which, for the purposes of this application, may be referred to as movable closure elements.

More specifically, the concepts presented herein (e.g., in connection with sealing assembly 300) may be applied to a packing arrangement and a movable closure element. That is, the sleeve-style sealing assembly 300 presented herein may embodied as a packing arrangement and plunger. In such instances, the annular seal element of the sealing assembly presented herein may be a packing disposed between a casing 206 and a plunger 202. Then, the plunger 202 and the annular seal element (e.g., the packing) may form the sealing assembly presented herein. To be clear, for the purposes of this application, a sealing assembly formed from a packing arrangement and plunger may be referred to as a sealing assembly for a movable closure element. By comparison, sealing assemblies embodied as plug-style or sleeve-style closure elements (with seal elements disposed around a stationary closure element) may be referred to as sealing assemblies for stationary closure elements.

Still referring to FIG. 2, during setup/servicing of the fluid end 104, sealing assemblies 300 may be inserted into segment 2124, segment 2224, and/or segment 2226. Then, retaining elements (e.g., retaining element 500 of FIG. 8A or retaining element 800 of FIG. 13, each of which may also be referred to as lock members, retaining nuts, etc.) may be installed exteriorly of each sealing assembly 300 to secure the sealing assembly 300 therein. In the embodiment depicted in FIG. 2, segment 2124, segment 2224, and segment 2226 include threads 2128, threads 2228, and threads 2229, respectively, disposed adjacent the external surface 210 of the casing 206. Thus, a retaining element

500/800 may be threaded into place to secure a sealing assembly 300 into segment 2124, segment 2224, or segment 2226.

However, in other embodiments, sealing assemblies 300 may be secured in segment 2124, segment 2224, and/or segment 2226 via any desired techniques, e.g., with fasteners, pressure, and/or additional closure components, either in addition to or in lieu of threaded retaining elements, provided that the techniques allow the sealing assemblies 300 to be removed for reconfiguration or replacement, pursuant to the techniques detailed below. Moreover, sealing assemblies 300 may be installed in segment 2124, segment 2224, and segment 2226 with the same or different techniques, structures, etc.; but, the sealing assemblies 300 should each be removable from their segment to allow for servicing of the sealing assemblies 300 and/or to allow for servicing of components/parts sealed inside the casing 206 by the sealing assembly 300 (e.g., one-way valves, the casing itself, etc.). As an example, in some embodiments, the sealing assemblies 300 may be threaded into engagement with threads on the casing 206, either in addition to or in lieu of threaded retaining elements.

Figure 3:
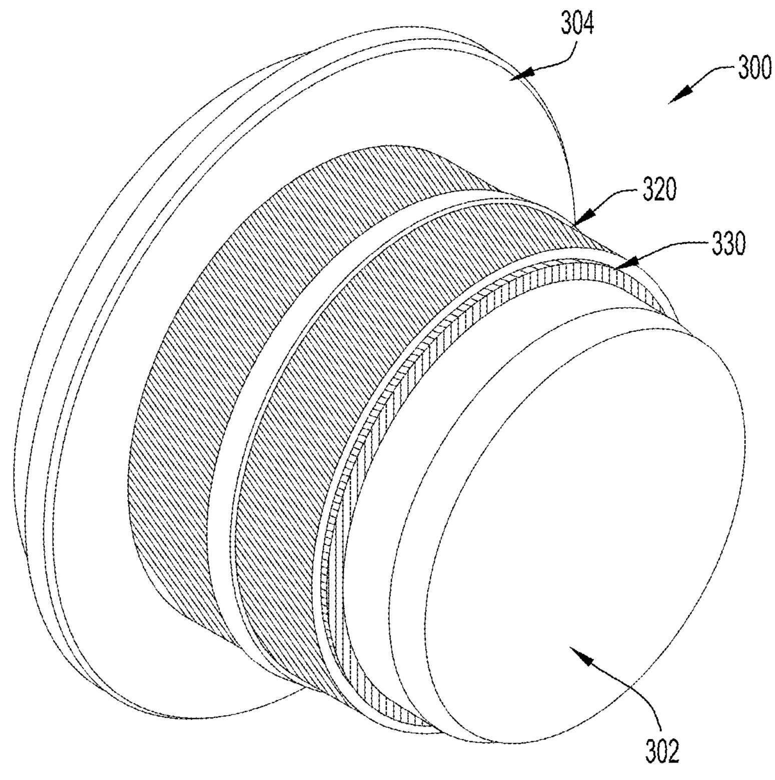
FIG. 3 is a perspective view of a sealing assembly formed in accordance with an example embodiment of the present application.

Now turning to FIG. 3, the sealing assembly 300 presented herein includes a closure element 302 and a seal element 320 (which may also referred to as a seal subassembly 320). In the embodiments depicted in at least FIGS. 3, 4A, 4B, 8A-8C, and 9-13, the closure element 302 is illustrated as a plug; however, as mentioned, closure element 302 may be in the form of a plug/cover, a sleeve, or even a plunger (with the seal element being in the form of a packing arrangement). Regardless, the closure element 302 has a substantially circular, or at least ovular, cross-sectional outer shape that is configured to substantially mate with a segment for which it is intended (e.g., segment 2124, segment 2224, or segment 2226). Additionally, in the depicted embodiments, the exterior of the closure element 302 has multiple steps/diameters defined by a flange 304 and a sealing portion 310 (see FIG. 4A).

Figure 4A:
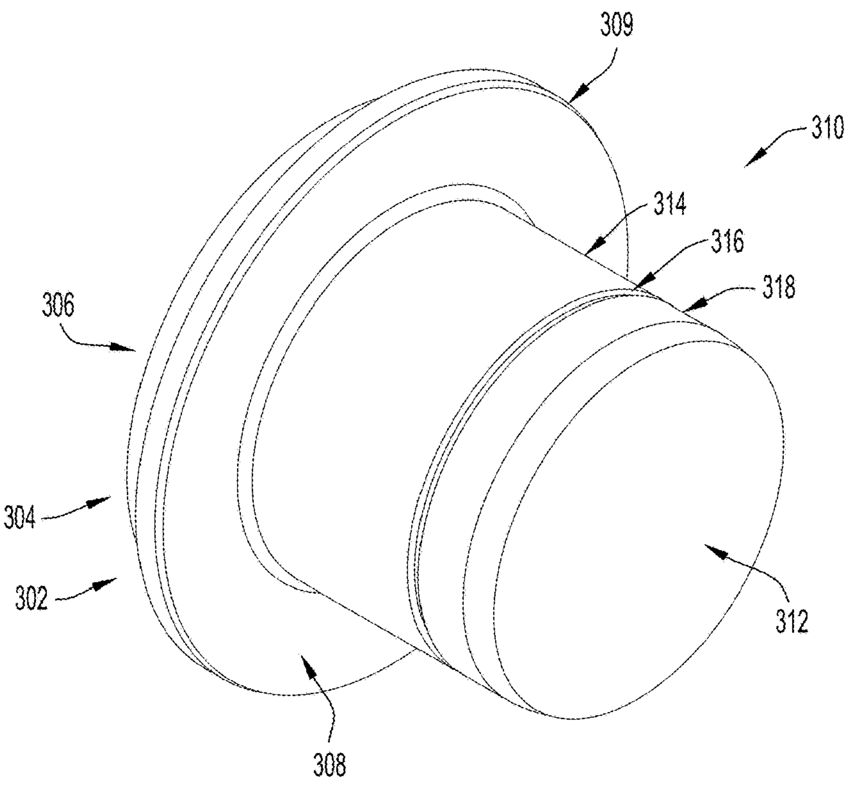
FIGS. 4A and 4B are perspective views of example closure elements for a fluid end. The closure element of FIG. 4A is included in the sealing assembly of FIG. 3 and the closure element of FIG. 4B is an alternative embodiment that may be included in sealing assemblies of the present application, such as those depicted in FIGS. 9, 12, and 13.

Specifically, and now turning to FIG. 4A, the flange 304 extends from a top or proximal surface 306 to a bottom or distal surface 308 while overhanging the sealing portion 310. Thus, when the sealing assembly 300 is inserted into a segment (e.g., segment 2124, segment 2224, or segment 2226), the flange 304 may sit on a seat defined in or at the end of the segment, limiting axial displacement of the sealing assembly within a segment. In some embodiments, sealing assemblies may be specifically designed for specific segments, for example, by dimensioning flange 304 to engage a seat with a specific diameter/specific dimensions.

In some embodiments, the proximal surface 306 of the flange 304 includes a cavity 307 (see, e.g., FIG. 8A) that may facilitate installation and/or create resilience for sealing. Additionally, in the depicted embodiments, an external radial surface (i.e., a side, outer surface) of flange 304 may be sloped or angled towards a radially extending lip 309 (shown best in FIGS. 8A-8C) to encourage sealing and/or engagement with a retaining element (e.g., retaining element 500). However, in various embodiments, the flange 304 may include any other features, in combination with one, none, or both of the cavity 307 and lip 309 for any desirable reason (e.g., sealing, installation, engagement with a retaining element, etc.).

Still referring to FIG. 4A, the sealing portion 310 is generally configured to receive the seal element 320 and to form one or more seals against a casing segment within which the sealing assembly 300 is installed (e.g., segment 2124, segment 2224, or segment 2226). However, before discussing these features, it is important to understand the terms "upstream" and "downstream." Any fluid flow through casing 206 flows through pumping chamber 208 and may contact a bottom or distal end of a sealing assembly 300 that forms a seal that closes a segment (e.g., to prevent flow between the pumping chamber 208 and the external surface 210 of the casing 206). Thus, if a first component (e.g., a surface or portion) is described as being "upstream" of a second component (e.g., another surface or portion) the first component will be closer to the fluid flow (and high pressures associated therewith) than the second component (i.e., closer to pumping chamber 208). On the other hand, if a first component is described as being "downstream" of a second component, the first component will be closer to the external surface 210 of the casing 206 (and the relatively low pressures associated therewith) than the second component.

Now, as can be seen in FIG. 4A, the sealing portion 310 extends from the distal surface 308 of the flange 304. In the depicted embodiments, the sealing portion 310 is substantially cylindrical, insofar as the term "substantially" indicates that edges of the cylinder (e.g., edges between a sidewall and a top/bottom) may be rounded, chamfered, or otherwise non-right angled. However, the sealing portion 310 need not be substantially cylindrical. In any case, the sealing portion 310 includes at least one lateral surface 314 on which the seal element 320 may be installed. In the embodiment depicted in FIG. 4A, the lateral surface terminates at a notch 316 that is spaced from a distal end of the sealing portion 310. That is, the lateral surface 314 for the seal element 320 extends over a portion of the sealing portion 310. Then, a secondary lateral surface 318 extends from the notch 316 to a distal surface 312 of the sealing portion 310 (which defines a distal end of the closure element 302).

In the depicted embodiment, the notch 316 is included in the sealing portion 310 so that the closure element 302 can receive and support a retaining ring 330 (see FIG. 3) that retains the seal element 320 on the lateral surface 314. The retaining ring 330 may be a snap ring that locks onto the notch 316, but this is just an example of a retaining feature and any other features, such as pins and/or threads could be used in combination with or in lieu of a retaining ring 330 secured onto notch 316 to axially secure a seal element 320 on the lateral surface 314 of the sealing portion 310. In any case, retaining an upstream end of the seal element 320 may be advantageous because it may allow the seal element 320 to be installed in a gap between the closure element 302 and casing 206 without modifying the casing 206 and/or the closure element 302 (especially if a retaining feature, such as retaining ring 330, can be secured to the closure element 302 without a notch 316 or other such mating feature).

Figure 4B:
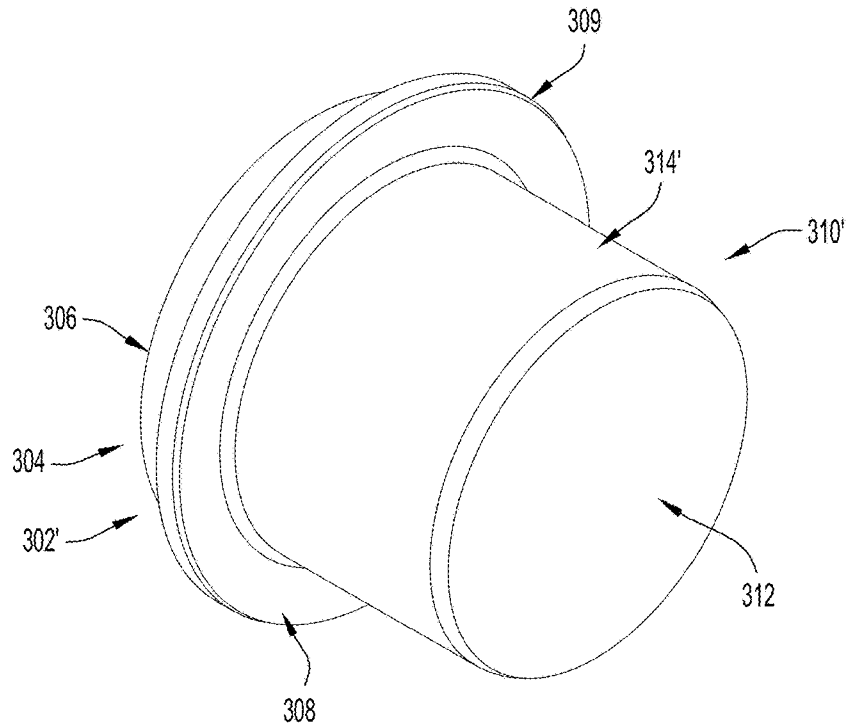

Now turning to FIG. 4B, in at least some embodiments, the lateral surface of the sealing portion 310 (e.g., the surface on which the seal element 320 may be installed) extends to and terminates at or adjacent the distal surface 312 of the closure element 302. Thus, FIG. 4B depicts another embodiment of a closure element 302' that is similar to closure element 302, except for its sealing portion 310'. More specifically, closure element 302' has a flange 304 that is similar to (if not identical to) the flange of closure element 302, but the sealing portion 310' of closure element 302' does not include a notch 316 or a secondary lateral surface 318. Instead, the sealing portion 310' includes a lateral surface 314' that extends from the bottom or distal surface 308 of the flange 304 to the distal surface 312 of the closure element 302. That said, due the similarities between closure element 302 and closure element 302', any description of like parts should be understood to apply to both embodiments unless otherwise explicitly stated.

To be clear, closure element 302 and closure element 302' are merely two examples of closure elements that may included in the sealing assembly 300 presented herein and other embodiments may include other variations. For example, a closure element suitable for the techniques presented herein may include a secondary lateral surface 318 that is shorter or longer than the secondary lateral surface 318 depicted in FIG. 4A (and it may be shorter or longer than lateral surface 314) and/or may include other features (e.g., in addition to or in lieu of notch 316). Still further, as mentioned, in at least some embodiments closure element 302 may be configured as a sleeve or plunger (an example of which is discussed below).

Now turning back to FIG. 3, in some embodiments, the seal element 320 may have some elasticity and/or resiliency so that the seal element 320 can be slid over the distal surface 312 of the sealing portion 310 and onto the lateral surface 314 (for simplicity, seal elements 320 are generally described herein with respect to lateral surface 314, but this is merely representative of any lateral surface included on a closure element, such as lateral surface 314'). Then, this elasticity and/or resiliency may bias the seal element 320 inwards against the lateral surface 314 once the seal element 320 is disposed around the lateral surface 314. That is, a resiliency or elasticity of the seal element 320 may create inwards pressure that removably couples the seal element 320 to the lateral surface 314 of the closure element 302. Additionally or alternatively, the seal element 320 may be skive cut to facilitate sliding/stretching. In any of these instances, when a seal created by the seal element 320 begins to fail, the seal element 320 may be slid over the distal surface 312 of the sealing portion 310 to remove and replace or reconfigure the seal element 320.

However, in other embodiments, the seal element 320 need not be resiliently biased against the lateral surface 314 and could, for example, sit between the closure element 302 and the casing 206. In some of these embodiments, the seal element 320 may be axially secured between the flange 304 and a retaining ring 330 without creating pressure against the lateral surface 314. Additionally or alternatively, the seal element 320 may be axially secured between the flange 304 and a portion of casing 206 without creating pressure against the lateral surface 314. Then, during operations, the retaining ring 330 and/or casing 206 may prevent axial movement of the seal element 320 in an upstream direction and, may, for example, convert upstream axial movement into radial compression against casing 206 and/or the closure element 302. Likewise, the flange 304 and/or casing 206 might prevent axial movement of the seal element 320 in a downstream direction and, may, for example, convert downstream axial movement into radial compression against casing 206 and/or the closure element 302.

In fact, in some embodiments, sliding an unbiased seal element 320 over the closure element 302 and/or into the casing 206 may prove advantageous since it will remove the need for stretching and/or cutting (which is typically required when a seal element 320 slips into a groove formed in the closure element). When this stretching and cutting is eliminated, the seal element 320 can be formed from harder materials (e.g., minimally stretchable) and/or can be a continuous, uncut element. For example, the seal element 320, or at least portions thereof, may have a hardness of at least Shore 60D. Additionally or alternatively, the seal element 320, or at least portions thereof, could be made of different materials when the seal element 320 need not be stretched or cut (e.g., in addition to or instead of pure rubber), such as fiber-filled or fabric-reinforced constructions. However, to be clear, retaining ring 330 and/or the casing 206 can also retain a seal element 320 that is biased against the lateral surface 314 by its resiliency/elasticity. Additionally or alternatively, insertion of the sealing assembly 300 into a segment of the casing 206 (e.g., segment 2124, segment 2224, or segment 2226) may generate compressive forces that removably couple the seal element 320 to the closure element 302.

Still further, in some embodiments, the seal element 320 may be irremovably coupled (e.g., integrally formed with or bonded to) to the closure element 302. Thus, the sealing assembly 300 may be a unitary or monolithic component. However, in such embodiments, when a seal formed by the seal element 320 begins to leak/fail, the entire sealing assembly 300 might need to be replaced.

Now turning to FIGS. 5, 6, 7A, and 7B, these figures depict three embodiments of seal elements—seal element 320, seal element 320', and seal element 320"—that can be included in a sealing assembly 300 presented herein. However, the depicted embodiments are merely examples and are not intended to be limiting in any way. For example, even though certain figures include a certain number of seals, this does not mean that embodiments with a specific number seals must be formed/constructed in a specific manner. Instead, for brevity, FIGS. 5, 6, 7A, and 7B illustrate various seal element embodiments and various features, elements, concepts, and/or principles of one embodiment may be combined with various features, elements, concepts, and/or principles of any other embodiment in any manner.

Figure 5:
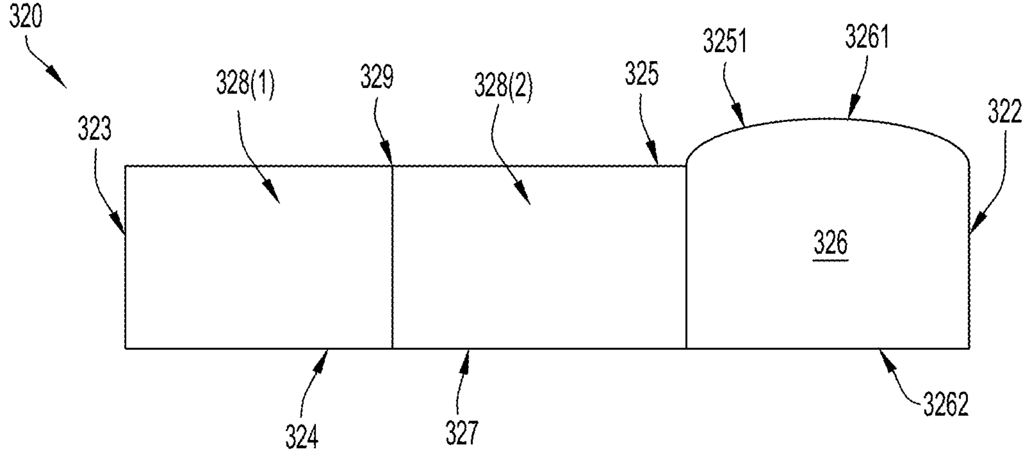
FIGS. 5 and 6 are schematic illustrations of sectional views of example embodiments of seal elements that may be included in the sealing assembly presented herein.
Figure 6:
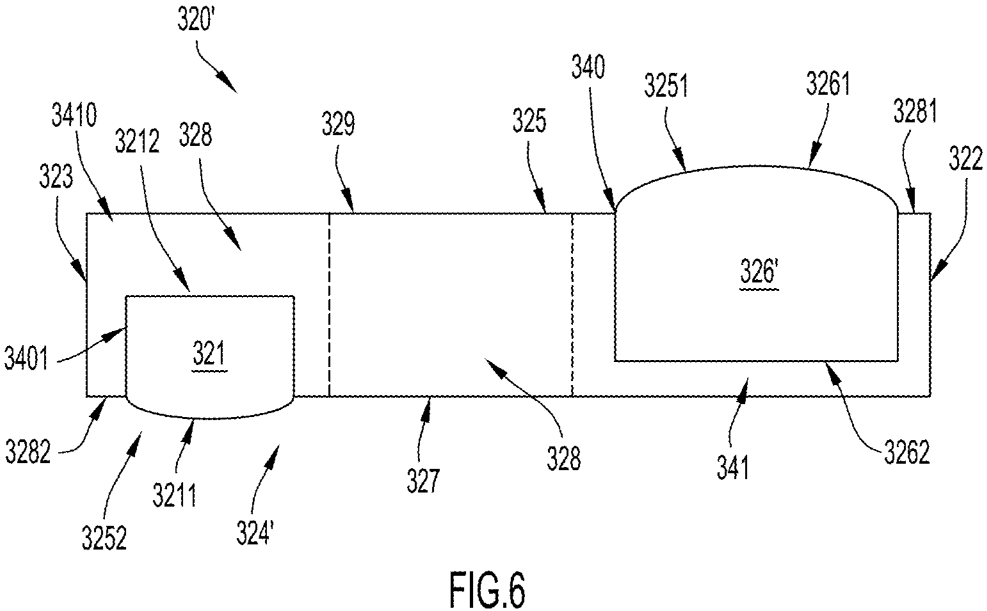

As some specific examples, the embodiments of FIG. 5 and/or the embodiment of 7A and 7B could be formed with multiple seals and/or the embodiment of FIG. 6 could include a single seal. Additionally or alternatively, a portion of the FIG. 5 embodiment could be combined with a portion of the FIG. 6 embodiment to form a seal element suitable for the sealing assembly 300 presented herein. In fact, in embodiments, certain seal element features may render a seal element suitable for specific closure elements or casing segments, as is discussed in further detail below.

Now turning to FIGS. 5 and 6, these Figures are diagrammatic/schematic illustrations of seal elements and do not necessarily depict accurate dimensions/relationships of features thereof. Moreover, FIGS. 5 and 6 depict similar embodiments with many like parts and are labeled with many like numerals. Thus, any such description of like parts should be understood to apply to both embodiments unless otherwise explicitly stated. As an example of a similarity, seal elements 320 and 320' each extend from a downstream end 323 to an upstream end 322. Although these ends are defined by different portions of elements 320 and 320', in both embodiments, the seal elements 320 and 320' have an overall length that will extend over at least a portion of a lateral surface 314 of the sealing portion 310 of the closure element 302.

Seal elements 320 and 320' each also include an internal surface 324 and 324', respectively, that abuts the lateral surface 314 when one of the seal elements 320 and 320' is installed around a closure element 302 (again, for simplicity, closure element 302 is used as an example and should be understood to be representative of any closure element unless otherwise indicated). Still further, in the depicted embodiments, seal elements 320 and 320' each include an external surface 325 that includes or defines at least one protruding seal 3251. In the depicted embodiment, aside from the at least one protruding seal 3251, the external surface 325 is substantially planar (e.g., flat). However, in other embodiments, the external surface 325 of seal element 320, seal element 320', or any other embodiment thereof, may be linear, sloped, or shaped in any other desirable manner.

In FIG. 5, the exterior surfaces of seal element 320 (e.g., downstream end 323, upstream end 322, internal surface 324, and external surface 325) are defined by three components: a first seal carrier 328(1), a second seal carrier 328(2), and a seal ring 326. In the depicted embodiment, seal carriers 328(1) and 328(2) are identical components and each define a flat exterior surface 329 and a flat interior surface 327 that is parallel to the exterior surface 329. The seal ring 326 also includes an internal surface 3262 and an external surface 3261. The external surface 3261 defines the at least one protruding seal 3251.

More specifically, the external surface 3261 of the seal ring 326 protrudes above, but transitions smoothly from, the flat exterior surfaces 329 of seal carriers 328(1) and 328(2) to define the at least one protruding seal 3251. However, collectively, external surfaces 329 and 3261 define the external surface 325 of the seal element 320. Meanwhile, the internal surface 3262 of the seal ring 326 aligns with the flat interior surface 327 of seal carriers 328(1) and 328(2) to define the flat internal surface 324 of the seal element 320. That said, in other embodiments, the seal element 320 can be formed from separate elements of different shapes and sizes, with or without defining a flat internal surface 324 and/or an external surface 325 with a flat surface that smoothly transitions to a protruding seal 3251, provided at least one at least one protruding seal 3251 is defined.

By comparison, in FIG. 6, the seal element 320' includes two seal elements: a first seal ring 326' that protrudes from an external surface 325 of the seal element 320; and a second seal ring 321 that protrudes an internal surface 324 of the seal element 320. This arrangement of seals allows seal element 320' to seal against a flat lateral surface 314 included on the closure element while also sealing against a flat surface of a casing segment (e.g., segment 2124, segment 2224, or segment 2226). That is, this arrangement of seals allows the seal element 320' to be sandwiched between and seal against both a closure element 302 and casing segment without necessarily modifying or machining the closure element 302 or the casing segment. As mentioned above, FIG. 6 is merely one example of this dual-seal arrangement (i.e., seals on opposing lateral surfaces) and a dual-seal arrangement could also be included in other embodiments, such as the embodiment of FIG. 5. For example, seal carrier 328(1) and/or seal carrier 328(2) could be replaced with a seal ring 326 arranged in an upside-down orientation as compared to the seal ring 326 depicted in FIG. 5.

In any case, with the arrangement depicted in FIG. 6, the exterior surfaces of seal element 320' (e.g., downstream end 323, upstream end 322, internal surface 324', and external surface 325) are defined by three features: a pocketed seal carrier 328, the first seal ring 326', and the second seal ring 321. Again, the external surface 3261 of the first seal ring 326' protrudes above, but transitions smoothly from, the flat exterior surface 329 of the seal carrier 328. Thus, surfaces 329 and 3261 collectively define the external surface 325 of the seal element 320 with at least one protruding seal 3251. However, now, the first seal ring 326' sits within a pocket 340 defined by the seal carrier 328 so that the seal carrier 328 supports and/or carries the first seal ring 326'. Thus, the internal surface 3262 of the first seal ring 326' sits above an elongate section 341 of the seal carrier 328. Consequently, the internal surface 3262 of the first seal ring 326' is spaced from and does not wear against the closure element 302 (at least in the depicted embodiment).

The internal surface 324 is substantially similar to the external surface 325 at least because an external surface 3211 of the second seal ring 321 protrudes below, but transitions smoothly from, the flat interior surface 327 of the seal carrier 328. Thus, surfaces 327 and 3211 collectively define an internal surface 324 of the seal element 320 with at least one protruding seal 3252. Again, the second seal ring 321 sits within a pocket 3401 defined by the seal carrier 328 so that the seal carrier 328 supports and/or carries the second seal ring 321. Thus, the internal surface 3212 of the second seal ring 321 sits above an elongate section 3410 of the seal carrier 328 and the internal surface 3212 of the second seal ring 321 is spaced from and does not wear against a casing segment (at least in the depicted embodiment).

Additionally, in FIG. 6, the seal carrier 328 includes a wall 3281 upstream of the first seal ring 326' and a wall 3282 downstream of the second seal ring 321. Thus, the seal carrier 328 substantially encapsulates three sides of both the first seal ring 326' and the second seal ring 321. However, in other embodiments, a "pocketed" seal carrier 328 may only border two sides of the first seal ring 326' and/or the second seal ring 321. For example, the upstream side of the first seal ring 326' may be accessible from exterior of the seal element 320' and could, for example, engage a retaining ring 330. Additionally or alternative, the downstream side of the second seal ring 321 may be accessible from exterior of the seal element 320' and could, for example, engage the flange 304 of closure element 302. That said, to reiterate, the embodiment depicted in FIG. 6 is merely an example and, in other embodiments, the seal carrier 328 may be formed from two or more seal carrier components. For example, one potential construction may include a component resembling seal carriers 328(1) and 328(2) sandwiched between two additional components with one, two, or no walls forming at least a portion of pockets 340 and/or 3401 (example divisions are illustrated by dashed lines in FIG. 6). As another example, seal carrier 328 might be formed from two components, with a split illustrated by one of the dashed lines of FIG. 6.

In fact, any of seal carriers 328, 328(1), and 328(2) can be formed from or replaced by any number of seal carriers, of any lengths (insofar as length denotes the dimensions extending in an x-direction of the drawings, when viewed in a portrait orientation), and seal carriers of shorter lengths may add more granularity to the seal placement options. Put another way, with the sealing assembly 300 presented herein, the seal element 320 can create sealing positions along an axial dimension (e.g., "length") of the seal element 320 and these positions may achieved with one or more seal carriers of any size and seals of any size. For example, a seal ring 326 might be able to move axially downstream or axially upstream in minimal axial increments of ⅛ inches. Thus, a number of possible arrangements may be determined based primarily on the length of seal element 320 and/or a length of the lateral surface 314 on which the seal element 320 is to be installed. By comparison, as mentioned above, closure elements with multiple grooves must include fin-like structures between grooves and thickness limitations imposed on these fin-like structures limit the number of sealing positions, as well the placement of sealing positions, that can be achieved along a certain bore length.

Finally, but perhaps most importantly, in FIGS. 5 and 6, the at least one protruding seal 3251 is illustrated proximate, if not adjacent (i.e., abutting) the upstream end 322 of the seal element 320, but this position is merely an example of a first position and should not be understood to be limiting in any way. As is described in detail below, seal element 320 and seal element 320' are each long enough to allow different positions/configurations that dispose first seal ring 326/326' and/or second seal ring 321 in different axial locations along the length of the seal element 320/320'.

For example, seal element 320 of FIG. 5 could be reconfigured to place the seal ring 326: (a) at the upstream end 322 of seal element 320, with seal carriers 328(1) and 328(2) downstream of seal ring 326; (b) at the downstream end 323 of the seal element 320, with seal carriers 328(1) and 328(2) upstream of seal ring 326; or (c), in a middle portion of seal element 320, with seal carriers 328(1) and 328(2) upstream and downstream of seal ring 326, respectively, sandwiching seal ring 326. On the other hand, the seal element 320' of FIG. 6 could be reconfigured to: (a) position the first seal ring 326' at the upstream end 322 of seal element 320' and simultaneously position the second seal ring 321 at the downstream end 323 of the seal element 320'; or (b) position the first seal ring 326' at the downstream end 323 of seal element 320' and simultaneously position the second seal ring 321 at the upstream end 322 of the seal element 320' (e.g., by reversing the orientation in which the seal element 320' is installed on a closure element 302 and/or in a casing segment). In any case, reconfiguring and/or replacing the seal element may move the seal element axially within the seal ring, such as by moving a seal element axially downstream.

Additionally or alternatively, different sets or kits of seal rings can be manufactured to locate the seal ring 326' in different axial locations, e.g., by creating the pocket 340 in different axial locations. Thus, in some embodiments, the seal ring 326 may be moved axially by switching locations of pieces/parts of the seal ring. Additionally or alternatively, at least a portion of the seal element can be replaced to reposition the seal ring. Indeed, if the seal ring 326/326' wears out while in a first axial position, seal ring 326/326' will need to be replaced regardless of whether pieces of the seal element 320/320' can be reconfigured to change the axial position of the seal ring 326/326'.

Figure 7A:
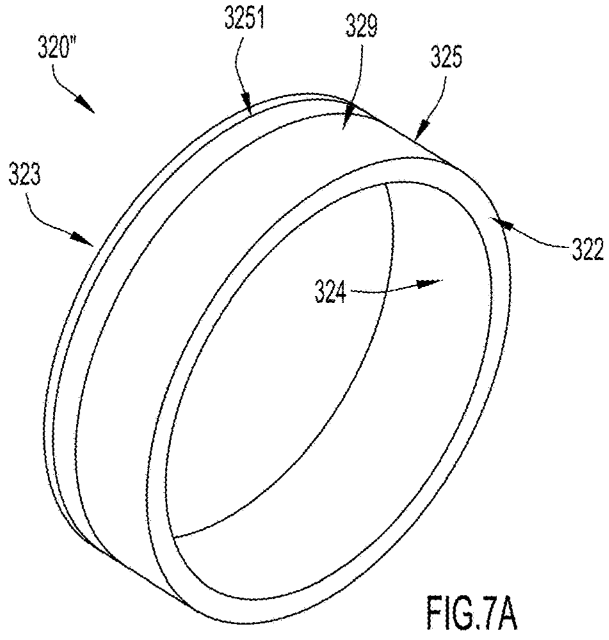
FIGS. 7A and 7B are perspective and side sectional views, respectively, of another example embodiment of a seal element that may included in the sealing assembly presented herein.
Figure 7B:
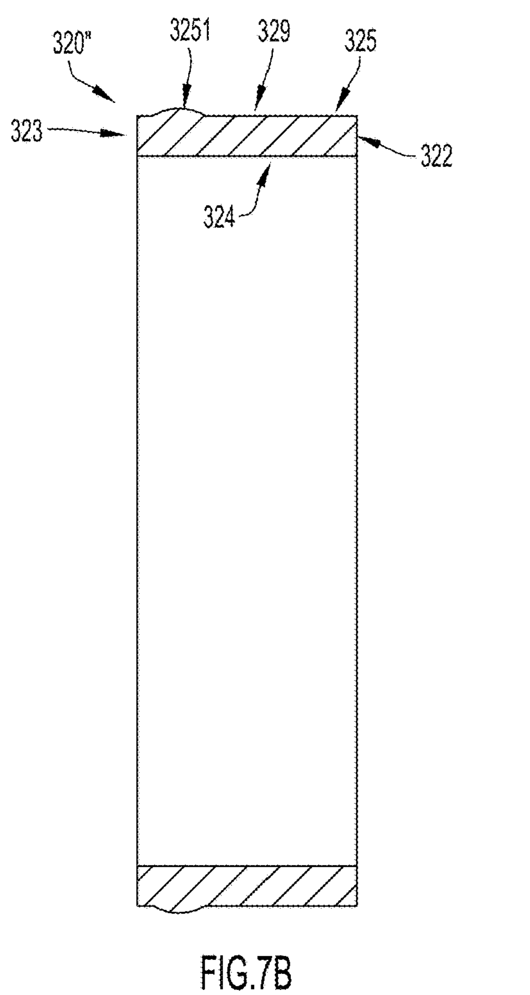

Now turning to FIGS. 7A and 7B, as yet another non-limiting example, in some instances, the seal element may be a single, unitary component. Seal element 320" illustrates an example one-piece embodiment. Aside from its one-part construction, seal element 320" is substantially similar to seal element 320 and 320'. Thus, like parts are again labeled with like numerals and any such description of like parts included herein should be understood to apply to seal element 320" unless otherwise explicitly stated.

The most notable difference between seal elements 320, 320', and 320" is perhaps one of perspective. Since seal element 320" is a one-piece seal element, an exterior surface 329 of seal element defines at least one protruding seal 3251 and a flat external surface 325 instead of being defined by these surfaces. However, that said, seal element 320" still includes at least one protruding seal 3251, an internal surface 324 configured to engage a lateral surface 314 of a closure element 302 (again, these are representative examples), an upstream end 322, and a downstream end 323. Moreover, for the purposes of this application, the portions of seal element 320" adjacent seal 3251 (e.g., the portion between surfaces 324 and 325 and/or the portion downstream of seal 3251) may be referred to as seal carriers, even though they are formed integrally with the seal 3251.

To reiterate, although FIGS. 7A and 7B depict the at least one protruding seal 3251 proximate the downstream end 323 of the seal element 320", this position is merely an example of one possible seal position (e.g., a last position) and should not be understood to be limiting. Likewise, although FIGS. 7A and 7B depict the at least one protruding seal 3251 as the only seal, this is merely an example and should not be understood to be limiting (e.g., other embodiments of monolithic seal elements 320" may include an interiorly extending seal). However, regardless of any variation or modifications, since seal element 320" is a one-piece part, seal element 320" does not include a removable/repositionable seal ring. Thus, to move the at least one protruding seal 3251 (or any other seal included therein/defined thereon) axially along the length of a closure element, the seal element 320" is either flipped/reversed or replaced with a seal element 320" that has the at least one protruding seal 3251 in a different axial position (e.g., so that the seal 3251 moves in a downstream or upstream direction over time). That said, the different axial positions can still be achieved with a single closure element, which provides cost savings (e.g., due to less machining) and spacing advantages as compared to solutions that use a closure element with multiple grooves.

Still further, and now referring generally to at least FIGS. 5, 6, 7A, and 7B, although the seal elements presented herein are largely described as having a protruding seal, this description should not be understood to mean that other portions of the seal elements do not or cannot form a seal. For example, in some embodiments, seal 3251, the seal ring 326/326' defining this seal 3251, and/or seal ring 321 is/are formed from a soft sealing component, such as rubber. Meanwhile, other portions of the seal element are formed from a comparatively harder material, such as plastic, that may still be able to seal against the casing 206 and/or closure element. Thus, in some embodiments and/or configurations, the seal elements presented herein may form a stack of seals, e.g., with at least some seals "backing up" seal 3251 and/or seal ring 321.

In the embodiments of FIGS. 5 and 6, these different materials may be incorporated into a single seal element 320/320' by manufacturing portions of the seal element 320/320' from different materials. Then, the different portions may be stacked onto each other (e.g., during insertion into a casing segment and/or onto a closure element), removably coupled together, and/or fixedly coupled together. By comparison, in the embodiments of FIGS. 7A and 7B, these different materials may be incorporated into a single seal element 320 with manufacturing processes capable of forming a single piece with two different materials, such as overmolding techniques. In some instances, these manufacturing processes may also be used to form the seal element embodiments of FIGS. 5 and 6, or at least portions thereof.

Figures 8A, 8B, 8C:
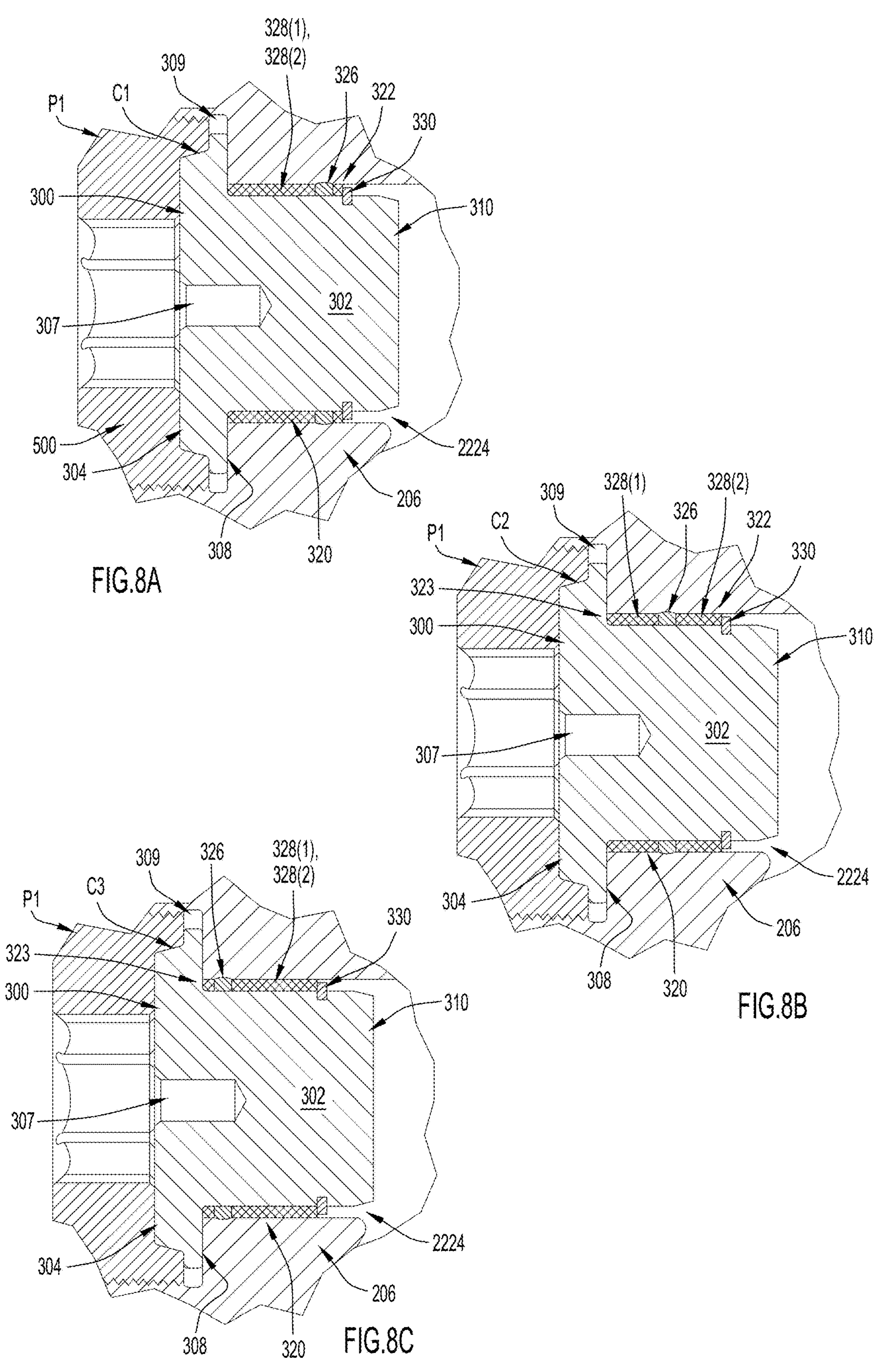
FIGS. 8A-8C are cross sectional views of a portion of the fluid end of FIG. 2 with the sealing assembly of FIG. 3 installed therein, the sealing assembly being disposed in a first configuration in FIG. 8A, a second configuration in FIG. 8B, and a third configuration in FIG. 8C.

Now turning to FIGS. 8A-8C, these Figures illustrate an example method of using the sealing assembly 300 presented herein to movably and/or progressively seal an externally open segment of a fluid end 104. For simplicity, these Figures only illustrate movably and/or progressive sealing of segment 2224 (e.g., progressive sealing with a suction plug), even though any casing segment could be sealed in the same manner. Additionally, and also for simplicity, the Figures illustrate the progressive sealing with closure element 302 (of FIG. 4A) and seal element 320 (of FIG. 5) even though it might be achieved with any combination of closure element(s) and seal element(s) presented herein, or variations thereof. Generally, the movable and/or progressive sealing is achieved by moving a repositionable seal axially in a gap between a closure element and a casing segment. Thus, over time, the repositionable seal (or replacement seals therefor) engages different, non-worn portions of the casing 206 and/or the closure element, allowing for high-performance sealing over an extended period of time (e.g., over the life of the fluid end).

In FIGS. 8A-8C, the progressive sealing moves progressively downstream. However, this sealing progression is merely an example and the seal can move axially in any desired manner, including progressively upstream, by moving to positions that vary upstream and downstream movement, etc. That, is, although FIGS. 8A-8C illustrate a seal moving progressively downstream, this is merely one example of axial movement and any description of progressive downstream seal movement included in this application should not be understood to limit the seal movement pattern in any way.

In fact, while progressive downstream axial movement of the seal may protect progressive sealing positions from exposure to pumped fluid and debris, moving the seal position upstream may also seal against unworn sections of the casing. This is because wear often focuses at the point at which a seal is formed (e.g., wear is often localized at the point of contact between a seal element and a casing). Thus, moving the seal axially upstream may still achieve seal advantages described herein in connection with moving a seal axially downstream. Indeed, regardless of how the seal position moves over time (e.g., progressively upstream, progressively downstream, or any other axial movement pattern), the closure element 302 need not include any grooves (which may be difficult and/or costly to machine). Moreover, since the seal positions are defined without grooves, multiple seal positions can be achieved over a small section of the casing 206 (e.g., seal positions that are very close together).

In FIG. 8A, the fluid end 104 is illustrated prior to a first activation. As can be seen, prior to a first activation, a seal element 320 with a seal ring 326 disposed at, or at least proximate to, an upstream end 322 of the seal element 320 is installed onto the closure element 302. That is, initially, the sealing assembly 300 is formed by installing a seal element 320 configured in a first configuration C1 onto the closure element 302. In the depicted embodiment, the seal element 320 is retained on the closure element 302 with the retaining ring 330. Thus, for example, the seal element 320 may be slid onto the lateral surface 314 of the closure element 302 until it abuts the bottom or distal surface 308 of the flange 304 (i.e., the underside of flange 304). Then, the retaining ring 330 may be slid to the lateral surface 314 of the closure element 302 until it abuts the seal element 320, locking the seal element 320 into place on the lateral surface 314 between the flange 304 and the retaining ring 330.

Regardless of how the seal element 320 is formed, once the seal element 320 is installed around the closure element 302 in a first configuration C1, the sealing assembly 300 can be installed in an externally open segment (i.e., a segment open to external surface 210), which is segment 2224 in the depicted embodiment. For example, the sealing assembly 300 may be pressed or pushed into segment 2224 into a secure position P1. Alternatively, the seal element 320 can be installed in the segment 2224 and then the closure element may be pushed into the segment 2224 and the seal element 320 so that the sealing assembly 300 is formed in the segment 2224, in a secure position P1. Either way, in at least some embodiments, including the depicted embodiment, the sealing assembly 300 is in the secure position P1 when a flange 304 of the sealing portion 310 sits on a set of the segment. Then, the sealing assembly 300 may be secured therein by a retaining element 500.

However, as mentioned, in FIG. 8A, the seal element 320 is one example of a sealing assembly 300 configured in the first configuration C1. In other embodiments, a monolithic seal element 320" with at least one protruding seal 3251 disposed at, or at least proximate to, the upstream end 322 could be installed in a gap between the closure element 302 and a wall of segment 2224 to achieve the first configuration C1. Likewise, a seal element 320' (e.g., a seal element with a pocketed seal carrier 328) could be installed in a gap between the closure element 302 and the segment 2224 with the at least one protruding seal 3251 is disposed at, or at least proximate to, the upstream end 322 of seal element 320' to achieve the first configuration C1.

In any case, when the sealing assembly 300 is in the secure position P1, the lateral surface 314 of the sealing portion 310 of the closure element 302 faces an interior wall of the externally open segment (e.g., segment 2224). Thus, installing the sealing assembly 300 in an externally open segment positions the seal ring 326 to seal against a first portion of an interior wall of the externally open segment (e.g., segment 2224). This closes the segment and prevents pumped fluid from traveling to the external surface 210 of the casing 206 via the segment.

Once all segments of the fluid end 104 are closed or connected to the appropriate piping/conduits (with the sealing techniques presented herein or other techniques), a power end of the reciprocating pump may be activated. Activating the power end drives pistons to pump fluid through the fluid end 104. That is, activating the power end pumps abrasive fluid through pumping chamber 208 in a cyclical fashion. Over time, abrasive elements (e.g., sand) can get wedged between seal components (e.g., seal ring 326 and the metal casing 206) and/or remove metal from the casing 206 and cause seal to leak or fail. If these seals fail, a high pressure stream of fluid can exit the fluid end, which is dangerous for operators, the overall pump, and potentially for the environment. Thus, over time, users monitor the fluid end 104 for leakage or other signs of deterioration. The sealing assembly 300 may also be examined when other parts of fluid end 104 are serviced.

When it comes time to change the sealing assembly 300, the power end is deactivated. Then, the sealing assembly 300 can be removed from its segment (e.g., segment 2224) and the seal element 320 can be reconfigured to a second configuration C2. Alternatively, in some embodiments, it may be possible to reconfigure the seal element 320 to a second configuration C2 while the sealing assembly 300, or a portion thereof, is installed in a segment (e.g., segment 2224).

As can be seen in FIG. 8B, when the sealing assembly is reconfigured to a second configuration C2, the seal element 320 is still positioned in a central axial position. More specifically, in the depicted embodiment, the seal ring 326 is positioned about halfway between the upstream end 322 and downstream end 323 of the seal element 320. However, in other embodiments, the seal ring 326 may be positioned closer to end or the other when in the second configuration C2. In any case, when the sealing assembly 300 is reinstalled in segment 2224 in position P1 (the same position as FIG. 8A) with the seal element 320 in the second configuration C2, the seal ring 326 will be positioned to seal against a second portion of the interior wall of segment 2224, such as a portion that is downstream of the portion engaged by the seal ring 326 in the first configuration C1.

As an example of a sealing assembly 300 configured in the second configuration C2, FIG. 8B illustrates the sealing assembly 300 being configured in the second configuration C2 by positioning a seal ring 326 between a first seal carrier 328(1) and a second seal carrier 328(2). However, in other embodiments, the seal element 320 could be configured in the second configuration C2 by positioning the seal ring 326 in a pocket 340 of a seal carrier 328 that defines the pocket in a position downstream of the first seal position (e.g., in a central position). That is, a seal carrier 328 may include an elongate section 341 extending between two rectangular sections to position a seal ring 326' in a position downstream of the first seal position. Still further, in other embodiments, sealing assembly 300 may be configured in the second configuration C2 by replacing a first seal element 320 with a monolithic seal element 320" with at least one protruding seal 3251 disposed in a position downstream of the first seal position (e.g., in a central position).

Importantly, in the depicted axial progression, a seal 326 of the first configuration C1 protects the portion of the casing against which the seal 326 of the second configuration C2 seals because the seal position in the first configuration C1 is upstream of the seal position in the second configuration C2 positions. That is, a seal 326 of the first configuration C1 may prevent high pressures and abrasive fluids from acting on the portion of the casing that the seal 326 seals against in the second configuration C2. Thus, when the seal element 320 is reconfigured from a first configuration C1 to a second configuration C2, the seal ring 326 may seal against a fresh (i.e., unworn) portion of the casing 206 (the portion defining an interior wall of the segment in which the sealing assembly 300 is installed).

Once the sealing assembly 300 is reinstalled in the fluid end 104 in its second configuration C2, the fluid end 104 may be fully sealed (assuming other seals have not been removed), and the power end can be reactivated to cause the fluid to flow through the fluid end 104 again. Thus, the techniques presented herein may provide a highly effective and efficient of servicing covers, plugs, and/or sleeve that minimizes down time for the pump.

Then, if the sealing assembly 300 starts to leak or otherwise fail again (e.g., before the fluid end 104 reaches the end of its useful life), the power end can be deactivated again and the sealing assembly can be removed from its segment (e.g., segment 2224) so that the seal element 320 can be reconfigured to a third configuration C3, as is shown in FIG. 8C. Alternatively, in some embodiments, it may be possible to reconfigure the seal element 320 to a third configuration C3 while the sealing assembly 300, or at least a portion thereof, is installed in a segment (e.g., segment 2224).

As can be seen in FIG. 8C, when the seal element 320 is reconfigured to a third configuration C3, the seal element 320 is positioned in a third axial position, which may be referred to as a downstream axial position. More specifically, in the depicted embodiment, the seal ring 326 is positioned proximate the downstream end 323 of the seal element 320, axially downstream of the position of the seal ring 326 in both the first configuration C1 and the second configuration C2. Thus, when the sealing assembly 300 is reinstalled in segment 2224 in position P1 with the seal element 320 in the third configuration C3, the seal ring 326 will be positioned to seal against a third portion of the interior wall of segment 2224. In the depicted embodiment, the third portion of the interior wall is downstream of the portions engaged by the seal ring 326 in the first configuration C1 and the second configuration C2.

Again, in FIG. 8C, the seal element 320 is one example of a sealing assembly 300 configured in the first configuration C3. In other embodiments, a monolithic seal element 320" with at least one protruding seal 3251 disposed at, or at least proximate to, the downstream end 323 could be installed in a gap between the closure element 302 and the interior wall of segment 2224 to achieve the third configuration C3. Likewise, a seal element 320' (e.g., a seal element with a pocketed seal carrier 328) could be installed in a gap between the closure element 302 and the segment 2224 with the at least one protruding seal 3251 disposed at, or at least proximate to, the downstream end 323 of seal element 320' to achieve the third configuration C3. Additionally or alternatively, the third configuration C3 may be a mirrored configuration of the first configuration C1. Thus, in some embodiments, the third configuration C3 can be attained by flipping the seal element 320 of the first configuration C1 upside down. As mentioned, in some instances, the seal ring 326 may wear during use in a first configuration. Thus, even if the third configuration C3 can be achieved by flipping the seal element 320 of configuration to a mirrored orientation, it may still be necessary to replace the seal ring (e.g., seal ring 326 or 326') as part of the reconfiguration.

Regardless of how the third configuration C3 is achieved, the earlier seals of configurations C1 and C2 may protect the portion of the casing against which the seal 326 of the third configuration C3 seals. That is, the seal ring(s) 326 of the first and second configurations C1 and C2 may prevent high pressures and abrasive fluids from acting on the portion of the casing that the seal 326 seals against in the third configuration C3. Thus, when the seal element 320 is reconfigured to a third configuration C3, the seal ring 326 may seal against a fresh (i.e., unworn) portion of the casing 206 (the portion defining an interior wall of the segment in which the sealing assembly 300 is installed).

Once the sealing assembly 300 is reinstalled in the fluid end 104 in its third configuration C3, the fluid end 104 may be fully sealed (assuming other seals have not been removed), and the power end can be reactivated to cause the fluid to flow through the fluid end 104 again. Notably, in at least some embodiments, the seal ring 326 will be configured to have a lifespan that is at least one-third of the lifespan of the casing 206. Thus, after two reconfigurations (e.g., from configuration C1 to C2 and from configuration C2 to C3), the fluid end may reach the end of its useful life and no further reconfigurations may be required. At this point, the sealing assembly 300 can be transferred to a new fluid end 104 or disposed of.

Now referring generally to FIGS. 8A-8C, in at least some instances, the various seal elements (or components thereof) needed for reconfiguration may be provided in a kit. For example, a kit may include one closure element 302 and two seal elements 320 designed to configure the sealing assembly in the first configuration C1 and the second configuration C2 (or the third configuration C3). Alternatively, a kit may include one closure element 302 and three seal elements 320 designed to configure the sealing assembly in the first configuration C1, the second configuration C2, and third configuration C3. In some instances, the two or more seal elements may be color coded to provide indications of configurations (e.g., configuration C1 seal elements are green, configuration C2 seal elements are yellow, and configuration C3 seal elements are red).

Regardless of the number and coloring of seal elements included in a kit, the seal elements in a kit may be variations of the same embodiment. For example, in some embodiments, all of the two or more seal elements in a kit may be rearranged version of the seal element 320 depicted in FIG. 5. Thus, as an example, a first seal element may include a seal ring 326 downstream of two or more seal carriers, a second seal element may include a seal ring 326 disposed between seal carriers, and a third seal element may include a seal ring 326 disposed downstream of the two or more seal carriers. Alternatively, a kit may include seal elements from multiple embodiments. For example, a first seal element of a kit may be formed in accordance with the embodiment the seal element 320 depicted in FIG. 5, a second seal element of the kit may be formed in accordance with the embodiment the seal element 320 depicted in FIG. 6, and a third seal element of the kit may be formed in accordance with the embodiment the seal element 320 depicted in FIGS. 7A and 7B. As another example, two seal elements may be formed from one embodiment and one or more additional seal elements may be formed from another embodiment.

Still further, in some instances, the kit need not include only fully formed seal elements and can include portions thereof. For example, a kit may include two seal carriers (e.g., seal carriers 328(1) and 328(2)) and three seal rings 326. Then, if necessary, the seal ring 326 can be replaced during three reconfigurations of the sealing assembly 300. As another example, a kit may include three seal rings 326' and two pocketed carriers 328. One of the carriers 328 may include a central pocket and the other carrier 328 may have an edge pocket that can be flipped to provide a downstream or upstream pocket. Then, the kit can be used to reconfigure a sealing assembly 300 between configurations C1, C2, and C3 while replacing the seal ring 326' during each reconfiguration (if necessary).

Now turning to FIGS. 9-13, these Figures illustrate examples where different embodiments of the sealing techniques presented herein are utilized to provide repositionable sealing. In some of these embodiments, the sealing assembly includes a different closure element as compared to the embodiment depicted in FIGS. 8A-8C. Additionally or alternatively, in some of these embodiments the sealing assembly seals against different casings as compared to the casing depicted in FIGS. 8A-8C (and FIG. 2). At a high-level, FIGS. 9-13 depict different sealing assemblies being used with a casing that includes a segment that is stepped adjacent the closure element. Thus, the casing defines a seat that can at least partially secure a seal element of a sealing assembly between the casing and a closure element. Moreover, some of these embodiments incorporate closure element 302' in the sealing assembly, while other embodiments incorporate a modified version of closure element 302', for example, to provide additional seal points between the closure element and the seal element of the sealing assembly.

For brevity, the description of FIGS. 9-13 included below focuses on differences between these embodiments, as compared to each other and previously described embodiments. However, before turning to this description, it should be noted that although casings of these embodiments—casing 206(1), casing 206(2), casing 206(3), and casing 206(4)—are not shown in their entireties, the casings are each substantially similar to casing 206. The main difference between casings 206(1)-206(4) and casing 206 is that casings 206(1)-206(4) are each shaped to define a seat. Specifically, segment 2224(1) of casing 206(1) defines seat 450, segment 2224(2) of casing 206(2) defines seat 450', segment 2224(3) of casing 206(3) defines seat 450' and a secondary seat 451, and segment 2224(4) of casing 206(4) defines seat 452.

Thus, any description of casing 206 included above should be understood to apply to casings 206(1)-206(4) unless otherwise explicitly stated (i.e., 206(1)-206(4) may each have a plurality of pumping chambers that are each defined by four intersecting segments). Moreover, to be completely clear, although FIGS. 9-13 depict sealing assemblies in one or two configurations (e.g., first configuration C1 for FIGS. 9-11 and a first configuration C4 and a second configuration C5 in FIGS. 12 and 13), these configurations are merely examples. Embodiments including the features depicted in FIGS. 9-13 may allow seal elements to be positioned is in any desired configuration or position in any manner described herein.

Now turning to FIG. 9 specifically, in this embodiment, a sealing assembly 300(1) is formed from the same seal element 320 as the sealing assembly 300 of FIGS. 8A-8C (e.g., seal element 320 of FIG. 5), but this seal element 320 is installed on closure element 302' (e.g., of FIG. 4B). Consequently, the upstream end 322 of the seal element is not secured against a retaining ring 330. Instead, sealing assembly 300(1) is installed within a casing 206(1) that includes a segment 2224(1) that defines a seat 450. That is, segment 2224(1) is stepped.

Thus, the upstream end 322 of the seal element 320 sits in and can rest on the seat 450, and the seat 450 can prevent axial movement of the seal element 320 towards the pumping chamber 208 (see FIG. 2). Meanwhile, a downstream end 323 of the seal element abuts the bottom or distal surface 308 of the flange 304 so that the seal element 320 is axially secured between (i.e., "axially sandwiched") between the flange 304 and the seat 450. Then, the seal 326 can be repositioned over the axial distance between the flange 304 and the seat 450 to provide the repositionable sealing presented herein, for example, by progressively moving in a downstream direction.

In FIGS. 10 and 11, the casings are again stepped, but casing 206(2) includes a segment 2224(2) with a single step to define a seat 450' while casing 206(3) includes a segment 2224(3) with two steps to define seat 450' and a secondary seat 451 that extends from a downstream end of seat 450'. In different embodiments, seat 450' may have different dimensions as compared to seat 450 of FIG. 9. Meanwhile, the secondary seat 451 may accommodate a flange of a seal element to further secure a seal element between the casing and closure element 302.

Additionally, the embodiments depicted in FIGS. 10 and 11 differ from the embodiments of FIGS. 8A-8C and 9 because the sealing assemblies are slightly different. First, the sealing assembly 300(2) of FIG. 10 includes: (1) a seal element 320" that is a modified version of seal element 320' (of FIG. 6); and (2) a closure element 302" that is a modified version of closure element 302' (of FIG. 4B). One main difference between seal element 320" and seal element 320' is that seal element 320" does not include the second seal ring 321. Instead, the closure element 302" includes a seal 3021 disposed in a single groove. That is, closure element 302" includes a single-pocketed seal carrier 328'. Meanwhile, one main difference between closure element 302" and closure element 302' (of FIG. 4B) is that the lateral surface 314 of the sealing portion 310 of closure element 302" includes a groove with a protruding seal 3021. Consequently, from one perspective, the second seal ring 321 of seal element 320' is transferred from seal element 320" to the closure element 302".

Second, the sealing assembly 300(2)' of FIG. 11 includes: (1) a seal element 320" that is a modified version of seal element 320" (of FIG. 10); and (2) the same closure element 302" as FIG. 10. One main difference between seal element 320'" and seal element 320" is that seal element 320'" includes a radial extension 3283 at its downstream end 323. Radial extension 3283 extends radially outwards and, thus, when seal element 320'" is disposed around closure element 302", the radial extension 3283 extends along the bottom or distal surface 308 of the flange 304, into the secondary seat 451. Consequently, radial extension 3283 may be secured between the casing 206(3) and the flange 304, and may further secure the downstream end 323 of the seal element 320'" in a particular axial location.

Regardless of the differences between the embodiments of FIGS. 10 and 11, the seal 3021 between the closure element 302" and the 320" remains fixed in place as long as the closure element 302' remains in place. Meanwhile, seal 326 can be repositioned axially within the pocketed carrier 328' in accordance with any of the techniques presented herein. For example, the seal 326 can be axially repositioned by flipping the orientation of the pocketed carrier 328' from the orientation shown in configuration C1. Alternatively, the seal 326 can be axially repositioned by replacing the pocketed carrier 328' with a pocketed carrier 328' that has a pocket in a different axial position. In any case, the interior seal 3021 may remain fixed as the seal 326 between the 320" and the segment 2224(2) is axially repositioned. Alternatively, the closure element 302" could be replaced to axially reposition seal 3021, either when the seal 326 is axially repositioned or independent of the axial repositioning of seal 326.

Figure 12:
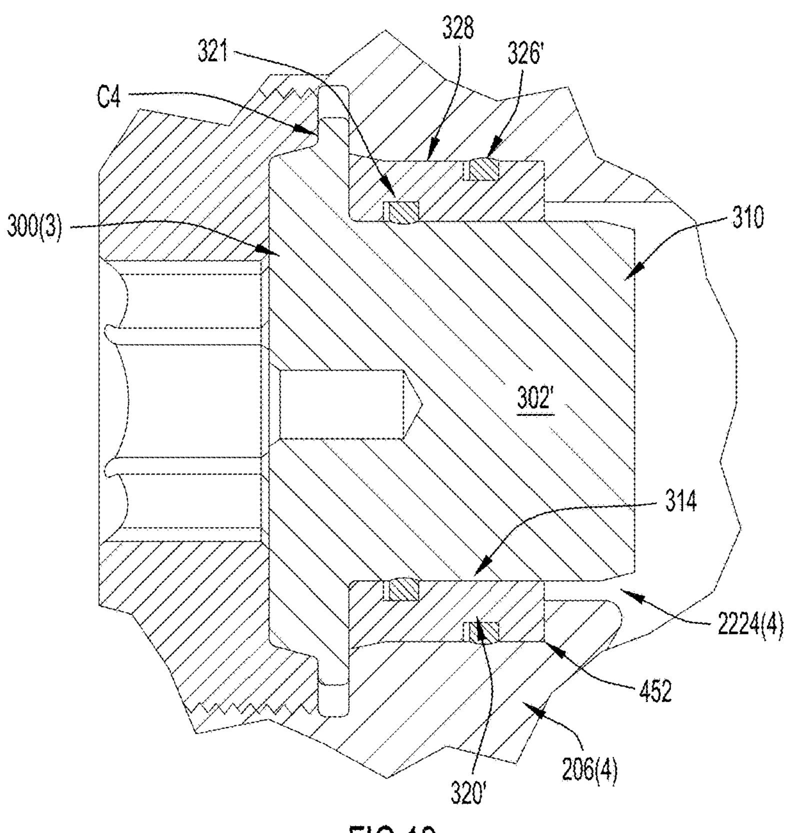
FIGS. 12 and 13 are cross sectional views of yet another example fluid end with the closure element of FIG. 4B and the seal element of FIG. 6 forming a sealing assembly installed therein, the sealing assembly being disposed in a first configuration in FIG. 12 and a second configuration in FIG. 13.
Figure 13:
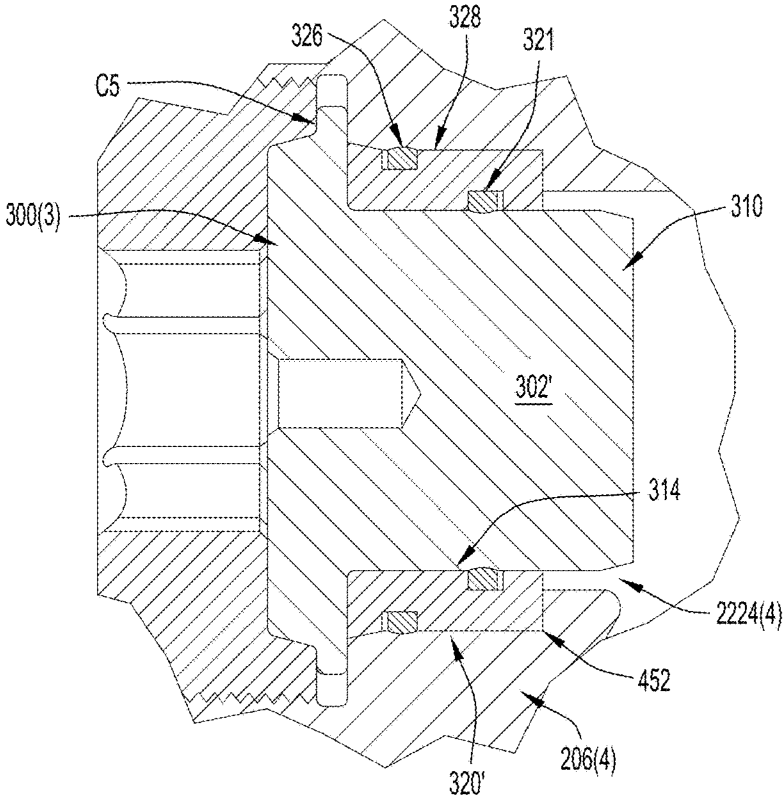

In FIGS. 12 and 13, a casing 206(4) with a segment 2224(4) again defines a seat 452, but now the seat 452 is wider than the seat 450' of FIGS. 10 and 11 or the seat 450 of FIG. 9. This allows the segment 2224(4) to accommodate a sealing assembly 300(3) formed from closure element 302 and seal element 320'. As can be seen, when sealing assembly 300(3) is installed in a casing in a first configuration C4, the second seal ring 321 is disposed downstream of the first seal ring 326'. Then, to axially reposition second seal ring 321 and/or seal ring 326, the sealing assembly 300(3) can be flipped into a second configuration C5 (e.g., removed, turned around and reinserted upside down as compared to its previous orientation) where the second seal ring 321 is disposed upstream of the first seal ring 326'.

Figure 14:
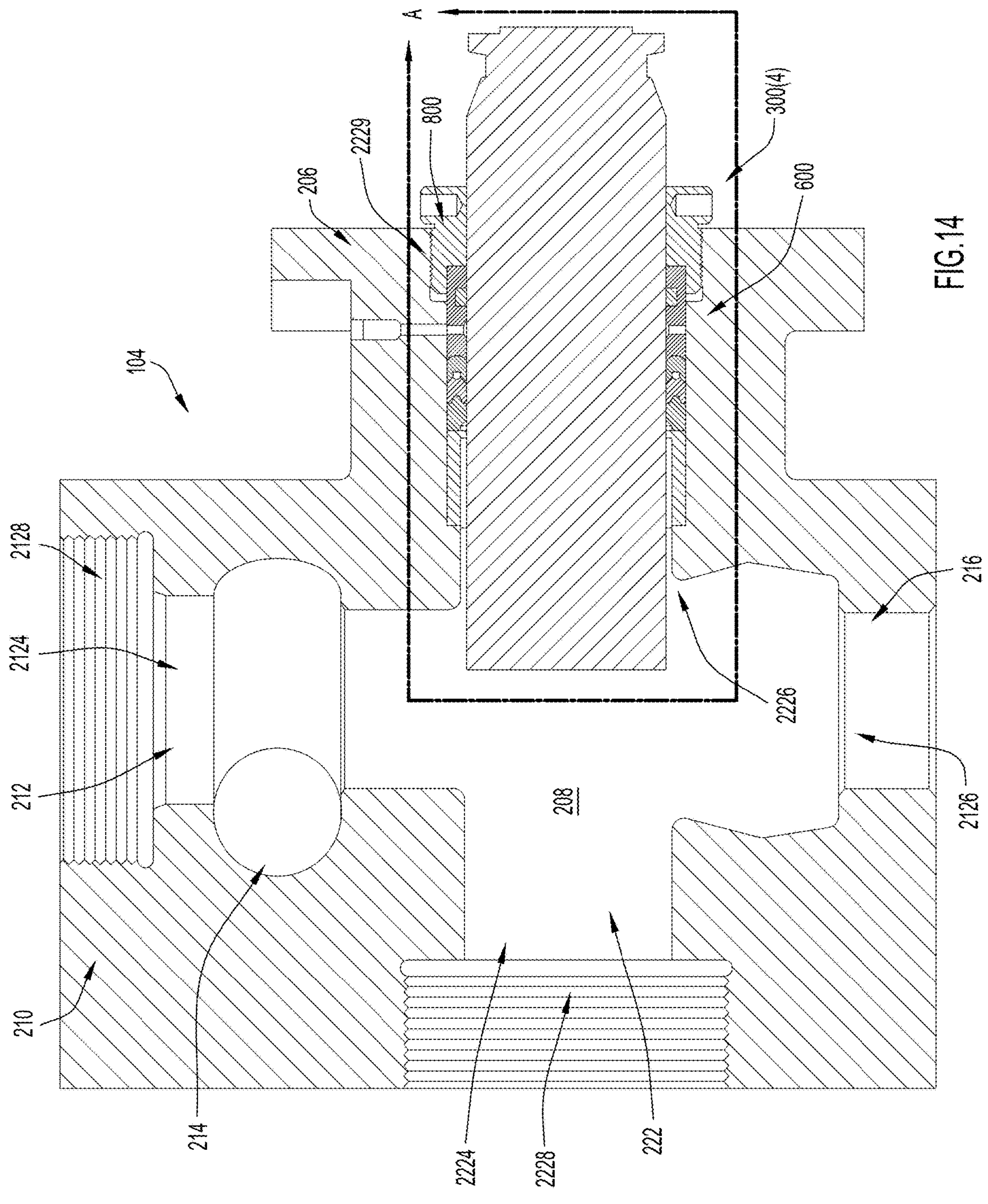
FIG. 14 is a cross sectional view of another example embodiment of a fluid end with a plunger, a sleeve, and a packing installed therein, the packing being formed in accordance with an embodiment of the presented application.
Figures 15, 16:
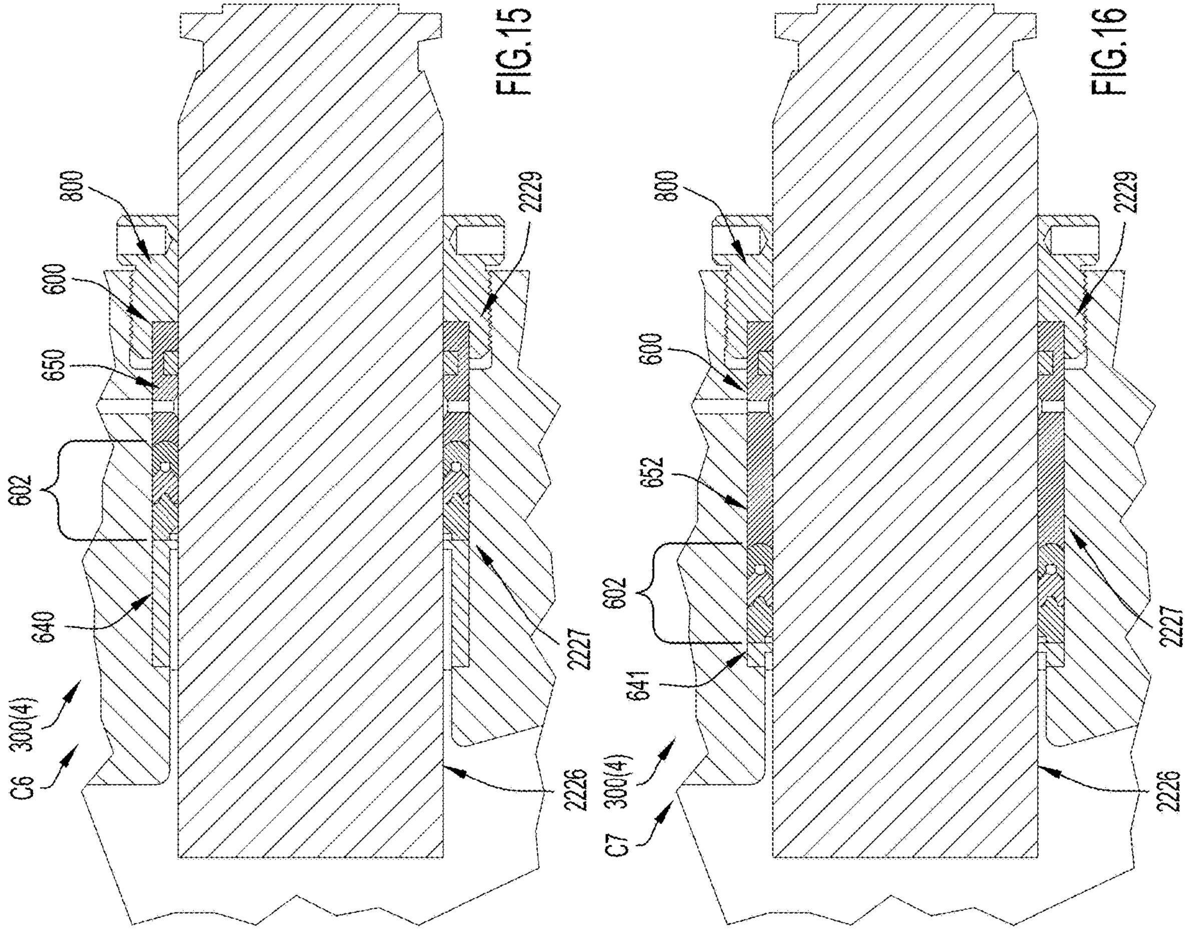
FIGS. 15 and 16 are detail views of inlay A from FIG. 14, with the packing being disposed in a first configuration in FIG. 14 and a second configuration in FIG. 16.

Now turning to FIGS. 14-16 for a description of how the techniques presented herein may be used while providing a repositionable seal for a movable closure element. For simplicity, FIGS. 14-16 show a packing 600 installed directly into segment 2226 without a sleeve therebetween, but this is not intended to be limiting. In fact, packing 600 may implement the techniques presented herein when installed without a sleeve, when installed within a sleeve-style sealing assembly 300, or when installed within a conventional sleeve. Thus, packing 600 may realize the advantages of the techniques presented herein in a variety of situations/arrangements.

In the depicted embodiment, packing 600 extends around a plunger 202, within stuffing box 2227. The packing 600 includes a number of sealing and/or scraping elements that are generally denoted herein as packing elements 602 and these packing elements 602 are axially secured within the stuffing box 2227 by one or more junk rings 640 and a lantern ring 650. In the depicted embodiment, the packing elements 602 include three rings. However, this is merely an example and in other embodiments, packing elements 602 may include any number of rings in any order or combination and any of the rings may include any desirable features or structures. Regardless of the number, shape, size, and/or configuration of rings in the packing elements 602, the one or more junk rings 640 are disposed upstream of the packing elements 602. Meanwhile, the lantern ring 650 disposed downstream of the packing elements 602, between the packing elements 602 and the retaining element 800 which, in the depicted embodiment, is secured to the segment 2226 via threads 2229. Thus, the one or more junk rings 640 and a lantern ring 650 axially enclose (i.e., axially sandwich) the packing elements 602 in the stuffing box 2227.

For the purposes of this application, the one or more junk rings 640 and the lantern ring 650 may be referred to as seal carriers. This is because the one or more junk rings 640 and the lantern ring 650 may control an axial position of seals formed by the packing elements 602. Consequently, the one or more junk rings 640 and the lantern ring 650 may serve an analogous purpose to and/or be reconfigured in the same manner as seal carriers 328(1), 328(2), seal carrier 328, and/or variations thereof. On the other hand, for the purposes of this application the plunger 202 may be referred to as a movable closure element. This is because the one or more junk rings 640, the lantern ring 650, and the packing elements 602 extend around the plunger 202 and cooperate with the plunger to close segment 2226. Thus, collectively, the packing 600 and the plunger 202 may form a sealing assembly 300(4) that can function in accordance with, and realize the advantages of, the techniques presented herein.

With that terminology in mind, in a first configuration C6, the lantern ring 650 and one or more junk rings 640 position the packing elements 602 in a first axial position. In this position, the packing elements 602 seal against a first portion of segment 2226 (but this could be a first portion of a sleeve if a sleeve were disposed between packing 600 and segment 2226). Additionally, in the first axial position, the packing elements 602 may seal against a first length of plunger 202, depending on the stroke length of the plunger 202. Thus, over time, the segment 2226 and/or the plunger 202 might wear in locations that contact the packing elements 602 in their first axial position. After a certain amount of wear, the lantern ring 650 and one or more junk rings 640 can be replaced with a lantern ring 652 and one or more junk rings 641 to reconfigure the packing 600 in a second configuration C7.

In the second configuration C7, the lantern ring 652 and one or more junk rings 641 position the packing elements 602 in a second axial position. In this position, the packing elements 602 may seal against a second portion of segment 2226 (but this could be a second portion of a sleeve if a sleeve were disposed between packing 600 and segment 2226). Additionally, in the second axial position, the packing elements 602 could potentially seal against a second length of plunger 202, depending on the stroke length of the plunger 202. Thus, by reconfiguring the packing 600 form the first configuration C6 to the second configuration C7, the segment 2226 and/or the plunger 202 might wear in different locations over time, realizing the advantages of repositionable seals discussed herein.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the sealing assembly described herein, or portions thereof may be fabricated from any commonly used seal materials, such as homogeneous elastomers, filled elastomers, partially fabric reinforced elastomers, and full fabric reinforced elastomers. Suitable resilient elastomeric materials includes, but re not limited to, thermoplastic polyurethane (TPU), thermoplastic copolyester (COPE), ethylene propylene diene monomer (EPDM), highly saturated nitrile rubber (HNBR), reinforced versions of the foregoing materials, such as versions reinforced with fibers or laminations of woven material, as well as combinations of any of the foregoing materials.

Similarly, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially."

The invention claimed is:

1. A sealing assembly for a fluid end of a reciprocating pump, the sealing assembly being installable within a segment of a casing of the fluid end and being arranged to form a seal with the segment, the sealing assembly comprising:

- a closure element with a sealing portion, the sealing portion having a lateral surface that faces an interior wall of the segment;
- a seal element sized to be installed around the lateral surface of the closure element, the seal element including a repositionable seal; and
- one or more seal carriers configured to position the repositionable seal with respect to the closure element, wherein the one or more seal carriers form a pocket for the repositionable seal, the pocket being axially repositionable to move the repositionable seal axially with respect to the closure element so that the repositionable seal can be positioned in multiple sealing positions.

2. The sealing assembly of claim 1, wherein an internal surface of the repositionable seal abuts the pocket and any internal surfaces of any seal carriers defining the pocket abut the lateral surface of the closure element.

3. The sealing assembly of claim 1, wherein the pocket is repositionable by replacing the one or more seal carriers with one or more new seal carriers that form a new pocket in a new axial position.

4. The sealing assembly of claim 1, wherein the repositionable seal is replaced with a new repositionable seal of like dimensions during a repositioning of the pocket.

5. The sealing assembly of claim 1, wherein the one or more seal carriers and the repositionable seal collectively define both an external surface and an internal surface of the seal element.

6. The sealing assembly of claim 5, wherein the one or more seal carriers are repositioned with respect to the closure element to axially reposition the repositionable seal, including to a first configuration in which one or more first axially extending surfaces of the one or more seal carriers abut the lateral surface of the closure element and to a second configuration in which one or more second axially extending surfaces of the one or more seal carriers abut the lateral surface of the closure element, the one or more second axially extending surfaces being opposite the one or more first axially extending surfaces.

7. The sealing assembly of claim 5, wherein the repositionable seal is replaced with a new repositionable seal of like dimensions during a repositioning of the repositionable seal.

8. The sealing assembly of claim 1, wherein the seal element is a monolithic component with the repositionable seal integrally formed therein and the repositionable seal is axially repositionable by replacing the seal element with a new seal element that includes a new seal in a new axial position.

9. The sealing assembly of claim 1, wherein the seal element is a first seal element and the sealing assembly further comprises:

- a second seal element sized to be installed around the lateral surface of the closure element and configured to replace the first seal element when fluid starts to leak through the repositionable seal and a first portion of the casing engaged with the repositionable seal, the second seal element including a second seal that is axially offset from the repositionable seal so that the second seal engages a second portion of the casing that is axially offset from the first portion of the casing.

10. The sealing assembly of claim 9, further comprising:

- a third seal element sized to be installed around the lateral surface of the closure element and configured to replace the second seal element when fluid starts to leak through the second seal and the second portion of the casing, the third seal element including a third seal that is axially offset from the repositionable seal so that the third seal engages a third portion of the casing that is axially offset from the second portion of the casing.

11. The sealing assembly of claim 1, further comprising a retaining element configured to retain the closure element in the segment of the casing, wherein the repositionable seal is movable axially between:

- a first position in which the retaining element retains the closure element in a fixed axial location within the segment and the one or more seal carriers cause the repositionable seal to engage a first axial portion of the interior wall of the segment; and
- a second position in which the retaining element retains the closure element in the fixed axial location within the segment and the one or more seal carriers cause the repositionable seal to engage a second axial portion of the interior wall of the segment, the second axial portion of the interior wall of the segment being separate and different from the first axial portion of the interior wall of the segment.

12. A seal kit for a sealing assembly that is configured to seal a segment of a casing of a fluid end of a reciprocating pump, the sealing assembly including a closure element with a lateral surface that faces an interior wall of the segment, and the seal kit comprising:

a first seal element configured to be installed around the lateral surface of the closure element, the first seal element including a first seal positioned to seal against a first portion of the casing forming the segment; and a second seal element configured to be installed around the lateral surface of the closure element, the second seal element including a second seal positioned to seal against a second portion of the casing forming the segment, the second portion being axially offset from the first portion, wherein the first seal element includes one or more seal carriers and the second seal element is formed by rearranging the one or more seal carriers from a first configuration in which one or more first axially extending surfaces of the one or more seal carriers abut the lateral surface of the closure element to a second configuration in which one or more second axially extending surfaces of the one or more seal carriers abut the lateral surface of the closure element, the one or more second axially extending surfaces being opposite the one or more first axially extending surfaces.

13. The seal kit of claim 12, further comprising:

a third seal element configured to be installed around the lateral surface of the closure element, the third seal element including a third seal positioned to seal against a third portion of the casing forming the segment, the third portion being axially offset from the second portion.

14. The seal kit of claim 12, wherein the first seal is removable from the one or more seal carriers, and the second seal element is formed by replacing the first seal with the second seal.

15. The seal kit of claim 12, further comprising a retaining element configured to retain the closure element in the segment of the casing, wherein:

when the first seal element is installed around the closure element, the retaining element retains the closure element in a fixed axial location within the segment and the one or more seal carriers cause the first seal to engage the first portion of the casing forming the segment; and when the second seal element is installed around the closure element, the retaining element retains the closure element in the fixed axial location within the segment and the one or more seal carriers cause the second seal to engage the second portion of the casing forming the segment.

16. The seal kit of claim 12, wherein the one or more seal carriers form a pocket configured to receive the first seal or the second seal, the pocket being axially repositionable to axially position the first seal or the second seal with respect to the closure element and the casing forming the segment.

17. The seal kit of claim 12, wherein the first seal element and the second seal element are single-piece elements and the second seal element is installed around the lateral surface of the closure element after removing the first seal element.

18. A method of sealing an externally open segment of a fluid end of a reciprocating pump with a sealing assembly, the fluid end being driven by a power end and the method comprising:

positioning a first seal element around a lateral surface of a closure element to form a first sealing assembly;

installing the first sealing assembly in the externally open segment so that the lateral surface of the closure element faces an interior wall of the externally open segment, the first seal element including one or more seal carriers and a first seal positioned to seal against a first portion of the interior wall of the externally open segment;

activating the power end to cause fluid to flow through the fluid end;

deactivating the power end;

removing the first seal element from the closure element;

positioning a second seal element around the lateral surface of the closure element to form a second sealing assembly by rearranging the one or more seal carriers of the first seal element to create a second seal position for a second seal, the rearranging comprising moving the one or more seal carriers from a first configuration in which one or more first axially extending surfaces of the one or more seal carriers abut the lateral surface of the closure element to a second configuration in which one or more second axially extending surfaces of the one or more seal carriers abut the lateral surface of the closure element, the one or more second axially extending surfaces being opposite the one or more first axially extending surfaces;

installing the second sealing assembly in the externally open segment so that the lateral surface of the closure element faces the interior wall of the externally open segment with the second seal positioned to seal against a second portion of the interior wall of the externally open segment that is axially offset from the first portion of the interior wall; and reactivating the power end to cause the fluid to flow through the fluid end.

19. The method of claim 18, further comprising:

subsequent to reactivating the power end, deactivating the power end again;

removing the second seal element from the closure element;

positioning a third seal element around the lateral surface of the closure element to form a third sealing assembly; and installing the third sealing assembly in the externally open segment so that the lateral surface of the closure element faces the interior wall of the externally open segment, the third seal element including a third seal positioned to seal against a third portion of the interior wall of the externally open segment that is axially offset from the second portion of the interior wall.

20. The method of claim 18, further comprising:

subsequent to installing the first sealing assembly in the externally open segment, retaining the first sealing assembly in a fixed axial location within the externally open segment with a retaining element; and subsequent to installing the second sealing assembly in the externally open segment, retaining the second sealing assembly in the fixed axial location within the externally open segment with the retaining element.

* * * * *